US012773936B2

(12) United States Patent
Roth et al.

(10) Patent No.: US 12,773,936 B2
(45) Date of Patent: Oct. 27, 2026

(54) PNEUMATIC BLADDER ARRANGEMENT

(71) Applicant: SCHUKRA BERNDORF GMBH, Berndorf (AT)

(72) Inventors: Felix Severin Roth, Nuremberg (DE); Martin Kalmutzki, Spalt (DE)

(73) Assignee: SCHUKRA BERNDORF GMBH, Berndorf (AT)

( * ) Notice: Subject to any disclaimer, the term of this patent is extended or adjusted under 35 U.S.C. 154(b) by 289 days.

(21) Appl. No.: 18/557,227

(22) PCT Filed: Mar. 23, 2022

(86) PCT No.: PCT/EP2022/057621
§ 371 (c)(1),
(2) Date: Oct. 25, 2023

(87) PCT Pub. No.: WO2022/228785
PCT Pub. Date: Nov. 3, 2022

(65) Prior Publication Data

US 2024/0217420 A1 Jul. 4, 2024

(30) Foreign Application Priority Data

Apr. 26, 2021 (EP) .................................... 21170469

(51) Int. Cl.
*B60N 2/60* (2006.01)
*B60N 2/62* (2006.01)
(Continued)

(52) U.S. Cl.
CPC ............... *B60N 2/914* (2018.02); *B60N 2/62* (2013.01); *B60N 2/7082* (2013.01); *A47C 4/54* (2013.01);
(Continued)

(58) Field of Classification Search
CPC ...... B60N 2/665; B60N 2/914; B60N 2/7082; A47C 7/446; A47C 7/467; A47C 4/54
See application file for complete search history.

(56) References Cited

U.S. PATENT DOCUMENTS 3,613,671 A * 10/1971 Poor ...................... B60N 2/976
601/149
4,920,591 A * 5/1990 Sekido ..................... B60N 2/99
297/287
(Continued)

FOREIGN PATENT DOCUMENTS

CN 106853784 A 6/2017
CN 107839551 A 3/2018
(Continued)

OTHER PUBLICATIONS

International Search Report and Written Opinion for Application No. PCT/EP2022/057621 dated Jul. 1, 2022 (12 pages).
(Continued)

*Primary Examiner* — Syed A Islam
(74) *Attorney, Agent, or Firm* — MICHAEL BEST & FRIEDRICH LLP

(57) ABSTRACT

The invention relates to a pneumatic bladder arrangement (100) for a seat (S) comprising a plurality of inflatable bladders (110), wherein at least one of the plurality of inflatable bladders (110), when inflated, has a first edge (111) with a first thickness (T1) and a second edge (112) with a second thickness (T2), wherein the first thickness (T1) is bigger than the second thickness (T2), the invention also relates to a seat (S) comprising the pneumatic bladder arrangement and to a manufacturing method for an inflatable bladder.

23 Claims, 12 Drawing Sheets

(51) Int. Cl.

| | |
|---|---|
| ***B60N 2/70*** | (2006.01) |
| ***B60N 2/90*** | (2018.01) |
| *A47C 4/54* | (2006.01) |
| *A47C 7/46* | (2006.01) |
| *B60N 2/80* | (2018.01) |

(52) U.S. Cl.

CPC ........ *A47C 7/467* (2013.01); *B60N 2002/899* (2018.02)

(56) References Cited

U.S. PATENT DOCUMENTS

| | | | | |
|---|---|---|---|---|
| 9,896,003 | B2 | 2/2018 | Tamura et al. | |
| 9,949,568 | B2 * | 4/2018 | Zouzal | A47C 7/14 |
| 10,569,678 | B2 | 2/2020 | Zouzal et al. | |
| 2017/0080834 | A1 | 3/2017 | Dry | |
| 2017/0156519 | A1 * | 6/2017 | Cheng | A47C 7/383 |
| 2018/0079335 | A1 | 3/2018 | Jaranson et al. | |

FOREIGN PATENT DOCUMENTS

| | | | |
|---|---|---|---|
| CN | 110435503 | A | 11/2019 |
| CN | 209600339 | U | 11/2019 |
| DE | 19740588 | A1 | 3/1999 |
| DE | 102016222465 | A1 | 6/2017 |
| EP | 3100906 | A1 | 12/2016 |
| WO | 1999048720 | A1 | 9/1999 |
| WO | 2007082682 | A1 | 7/2007 |

OTHER PUBLICATIONS

European Patent Office Extended European Search Report for Applicaton No. 21170469.7, dated Oct. 20, 2021 (7 pages).

Chinese Patent Office Action for Application No. 202280031066 dated Jan. 17, 2026 (22 pages including English machine translation).

* cited by examiner

PNEUMATIC BLADDER ARRANGEMENT

The present invention relates to a pneumatic bladder arrangement for a seat, to a seat incorporating the pneumatic bladder arrangement and to a method for manufacturing an inflatable bladder for a pneumatic bladder arrangement.

PRIOR ART

Seats are generally designed for a wide array of users, having different body shapes, so that seats are generally a compromise for different users. This results in the seat frequently not being very well adapted to the body contour of an occupant.

For some seats in which the occupant spends a long time, this can become a nuisance, uncomfortable or even painful. Moreover, for seats associated with large expenses, such as car seats, the users expect a very comfortable seating position.

Some areas of a seat, which are particularly subject to this problem, are the top part of a backrest and the cushion. For instance, taller occupants tend to lose contact with the top part or a backrest in their shoulder region. Similarly, occupants with longer legs tend to lose contact with a front part of a cushion in their thighs region. Moreover, for foldable seats, the rear part of a cushion can often present a gap toward the backrest when the backrest is folded.

Those problems thus generally relate to the fact that a seat has a shape that might not be suitable for all users. There is thus a general effort in developing seats which can change their shape to accommodate different users.

With respect to the part of the backrest close to the shoulders, for instance, existing shoulder supports are known from U.S. Pat. No. 9,896,003 B2 to include a pneumatic shoulder adjuster with the use of multiple stacked chambers and pivotable mechanisms with plates. Alternatively, DE 19740588 A1 describes a pneumatic shoulder support adjuster with two chambers positioned in the shoulder area of the backrest which adjust a mechanical support structure. Moreover, EP 3100906 A1 describes a shoulder adjuster that uses pneumatic chambers to tilt a mechanical structure to support the shoulders. Document US 2018264981 described a bladder arrangement for a thoracic region of a seat.

In general, known systems thus employ one or more rigid, mechanical elements, such as plates, pivots and joints, for modifying the shape of the seat.

This causes the known systems to be more expensive to manufacture and assembly. Additionally, mechanical tilting mechanisms in the frame of the seat, and/or mechanical elements built on top of the seat frame, may cause safety dangers in the event of collisions, when the seats are mounted in vehicles. Additionally, many known solutions are not able to adjust the support along the entire width of the seat, thus being unable to fully adapt to the various possible shapes of the users' body.

SUMMARY

The present invention has been developed to address at least some of the problems existing with the known solution.

The invention generally allows the seat shape to individually to the body shape of the occupant. Particular embodiments of the invention relate in particular to the shoulder region, to the thigh region and to region of a cushion next to the backrest.

The invention is defined by the independent claims. Dependent claims further indicate additional advantageous implementation features.

A pneumatic bladder arrangement for a seat can comprise a plurality of inflatable bladders, wherein at least one of the plurality of inflatable bladders, when inflated, can have a first edge with a first thickness and a second edge with a second thickness, wherein the first thickness can be bigger than the second thickness.

Thanks to this configuration it is advantageously possible implement a shape with two different thicknesses at two edges, for instance resembling a wedge-like shape. This allows an advantageous implementation of the pneumatic bladder arrangement as various positions of the seat which can benefit from such uneven shape.

In some cases, the at least one of the plurality of inflatable bladders, when inflated, can have a wedge-like shape.

In some cases, the at least one of the plurality of inflatable bladders, when inflated, can have a wedge-like cross section shape.

Thanks to such configurations it is advantageously possible to have a substantially gradual decrease in thickness from the thicker edge to the thinner edge.

In some cases, the at least one of the plurality of inflatable bladders can have a third edge and a fourth edge, wherein a first width between the third edge and the fourth edge in proximity of the first edge can be larger than a second width between the third edge and the fourth edge in proximity of the second edge.

In some cases, the at least one of the plurality of inflatable bladders can have a trapezoidal-like shape.

Thanks to such configurations it is advantageously possible to implement the difference in thicknesses in the inflatable bladder.

In some cases, the at least one of the plurality of inflatable bladders can comprise a thickness defining element configured to limit an inflation thickness of the at least one of the plurality of inflatable bladders.

Thanks to this configuration it is advantageously possible to implement the difference in thicknesses in the inflatable bladder.

In some cases, the at least one of the plurality of inflatable bladders can further comprise a first sheet of flexible material and a second sheet of flexible material, which are bound together to form the at least one of the plurality of inflatable bladders, and wherein the thickness defining element can be bound to the first sheet of flexible material and to the second sheet of flexible material.

Thanks to this configuration it is advantageously possible to implement the thickness defining element in the inflatable bladder.

In some cases, the thickness defining element can be bound to the first sheet of flexible material and to the second sheet of flexible material in a direction substantially perpendicular to the first edge and/or to the second edge.

In some cases, the thickness defining element can be bound to the first sheet of flexible material and to the second sheet of flexible material in a substantially longitudinal direction of the at least one of the plurality of inflatable bladders.

In some cases, the thickness defining element can have a third width substantially corresponding to the first thickness and/or a fourth width substantially corresponding to the second thickness.

Thanks to such configurations it is advantageously possible to efficiently configure the thickness defining element for achieving an effective thickness defining operation.

In some cases, the thickness defining element can have a decreasing width between the third width and the fourth width.

In some cases, the thickness defining element can have a substantially trapezoidal or a substantially triangular shape.

Thanks to such configurations it is advantageously possible to obtain a gradual decrease in thickness in the inflatable bladder.

In some cases, the thickness defining element can be of the same material as the first sheet of flexible material and/or the second sheet of flexible material.

Thanks to this configuration it is advantageously possible to reduce the kinds of material needed for the manufacturing of the inflatable bladder.

In some cases, the at least one of the plurality of inflatable bladders can be a composite bladder and comprise a first sub-bladder and a second sub-bladder, which are overlapped and in pneumatic communication with each other.

Thanks to such configurations it is advantageously possible to implement the difference in thicknesses in the inflatable bladder.

In some cases, at least two of the plurality of inflatable bladders can at least partially overlap each other.

Thanks to this configuration it is advantageously possible to increase the difference in thickness between one side of the pneumatic bladder arrangement and the opposite side.

In some cases, the plurality of inflatable bladders can be arranged next to each other.

Thanks to this configuration it is advantageously possible to implement a pneumatic bladder arrangement wider than a single bladder.

In some cases, one or more couples of the plurality of inflatable bladders can each comprise a first inflatable bladder and a second inflatable bladder, and the first inflatable bladder can be in fluid connection with the second inflatable bladder through a fluid interconnection.

Thanks to this configuration it is advantageously possible to reduce the number of fluid supply connections to the pneumatic bladder arrangement.

In some cases, when the pneumatic bladder arrangement is mounted as shoulder support in a seat, the first edge can be higher than the second edge with respect to a vertical direction of the seat.

Thanks to this configuration it is advantageously possible to follow the natural shape of a user's back.

In some cases, when the pneumatic bladder arrangement is mounted as a leg support in a seat, the first edge can be closer to a front extremity of a cushion of the seat than the second edge.

Thanks to this configuration it is advantageously possible to follow the natural shape of a user's thighs.

In some cases, when the pneumatic bladder arrangement is mounted as a cushion support in a seat, the second edge can be closer to a front extremity of a cushion of the seat than the first edge.

Thanks to this configuration it is advantageously possible to compensate for a difference in height, and/or a gap, between the cushion and the backrest region of a seat, particularly when the seat is extended toward a horizontal direction.

In some cases, the first thickness can be comprised between 1 cm and 15 cm, preferably between 2 cm and 8 cm, and/or the second thickness can be comprised between 1 cm and 12 cm, preferably between 1 cm and 5 cm.

Thanks to this configuration it is advantageously possible to implement the pneumatic bladder arrangement which have been found by the inventors to allow use with a wide range of users.

In some cases, the plurality of inflatable bladders can comprise an odd number of bladders, preferably three or five bladders.

Thanks to this configuration it is advantageously possible to allow sufficient configurations of the pneumatic bladder arrangement while containing manufacturing costs.

A seat can comprise the pneumatic bladder arrangement, according to any of the previous descriptions.

In some cases, the seat can further comprise a non-stretchable trim and a stretchable trim, wherein the stretchable trim can be provided so as to allow inflating of the pneumatic bladder arrangement.

Thanks to this configuration it is advantageously possible to implement the pneumatic bladder arrangement in seats having a non-stretchable trim, In some cases, the stretchable trim can be provided at least in a part of the seat closer to the first edge than to the second edge.

Thanks to this configuration it is advantageously possible to make an efficient use of the stretchable trim.

A method for manufacturing an inflatable bladder for a pneumatic bladder arrangement for a seat, can comprise the steps of: providing a first sheet of flexible material, a second sheet of flexible material and a thickness defining element, bonding the first sheet of flexible material to the thickness defining element, bonding the second sheet of flexible material to the thickness defining element, and bonding the first sheet of flexible material to the second sheet of flexible material.

Thanks to this configuration it is advantageously possible to manufacture the inflatable bladder in a simple and effective way.

In some cases, the method cam further comprise the step of: bending the thickness defining element.

Thanks to this configuration it is advantageously possible to manufacture a plurality of inflatable bladders from single sheets of flexible material.

DETAILED DESCRIPTION OF PREFERRED EMBODIMENTS

Figure 1A:
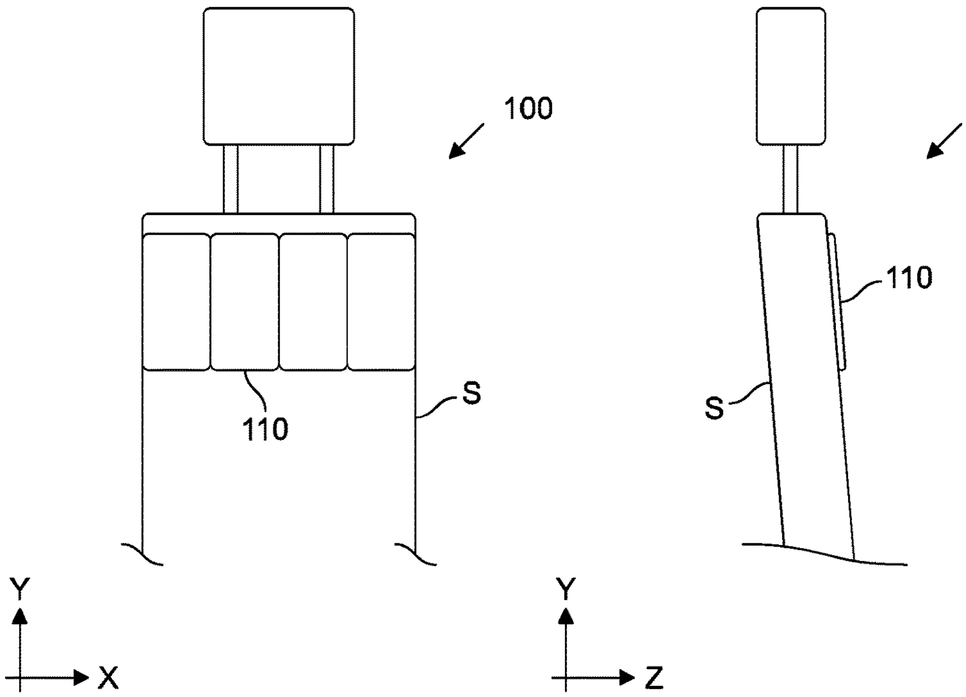
FIG. 1A schematically illustrates a top and a side view of a pneumatic bladder arrangement 100 mounted on a seat S, in a substantially deflated configuration, FIG. 1B schematically illustrates a top and a side view of the pneumatic bladder arrangement 100 mounted on a seat S, in a substantially inflated configuration, FIG. 1C schematically illustrates an enlarged top and cross section view of an inflatable bladder 110, in a substantially inflated configuration, FIG. 2 schematically illustrates an enlarged top and cross section view of an inflatable bladder 210, in a substantially inflated configuration, FIG. 3 schematically illustrates an enlarged top and cross section view of an inflatable bladder 310, in a substantially inflated configuration, FIG. 4 schematically illustrates an enlarged top and cross section view of an inflatable bladder 410, in a substantially inflated configuration, FIGS. 5A and 5B schematically illustrate a method 500 for manufacturing an inflatable bladder, FIGS. 6A and 6B schematically illustrate a method 600 for manufacturing an inflatable bladder, FIG. 7 schematically illustrates a top view of a pneumatic bladder arrangement 700, FIG. 8 schematically illustrates a top view of a pneumatic bladder arrangement 800, FIGS. 9A and 9B respectively schematically illustrates a top view of a pneumatic bladder arrangement 900A and 900AB, FIG. 10A schematically illustrates a top and a side view of a pneumatic bladder arrangement 1000 mounted on a seat S, in a substantially deflated configuration, FIG. 10B schematically illustrates a top and a side view of the pneumatic bladder arrangement 1000 mounted on a seat S, in a substantially inflated configuration, FIG. 11A schematically illustrates a top and a side view of a pneumatic bladder arrangement 1100 mounted on a seat S, in a substantially deflated configuration, FIG. 11B schematically illustrates a top and a side view of the pneumatic bladder arrangement 1100 mounted on a seat S, in a substantially inflated configuration, FIG. 12 schematically illustrates an enlarged top and a cross section view of an inflatable bladder 1210, in a substantially inflated configuration, as well as an exploded cross section view of the inflatable bladder 1210, FIG. 13A schematically illustrates a top and a side view of a seat S, with a pneumatic bladder arrangement in a substantially deflated configuration, FIG. 13B schematically illustrates a top and a side view of a seat S, with a pneumatic bladder arrangement in a substantially inflated configuration.
Figure 1B:
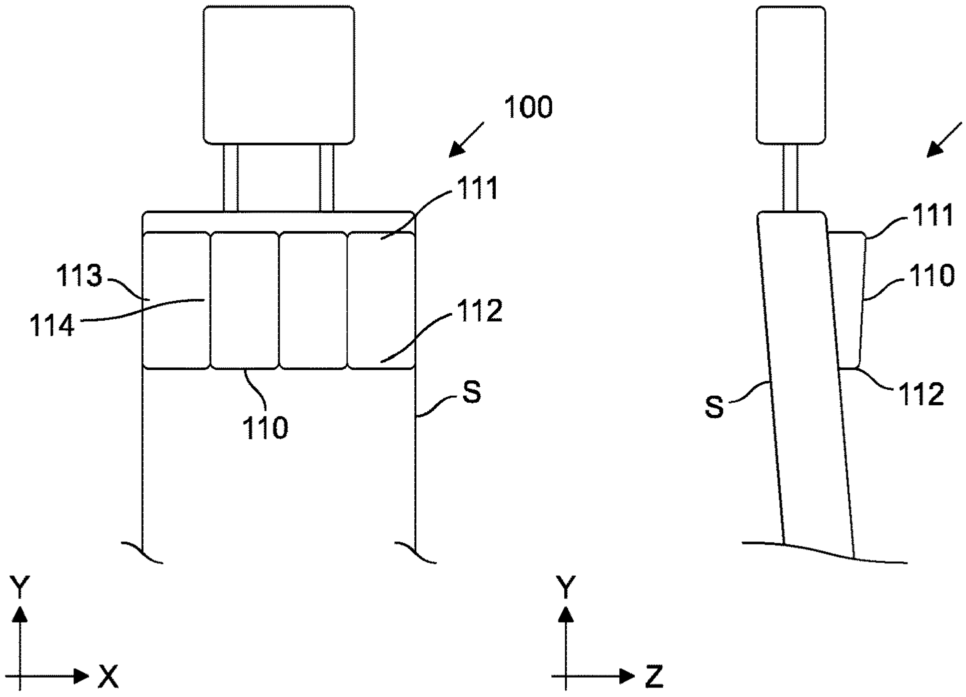
Figure 1C:
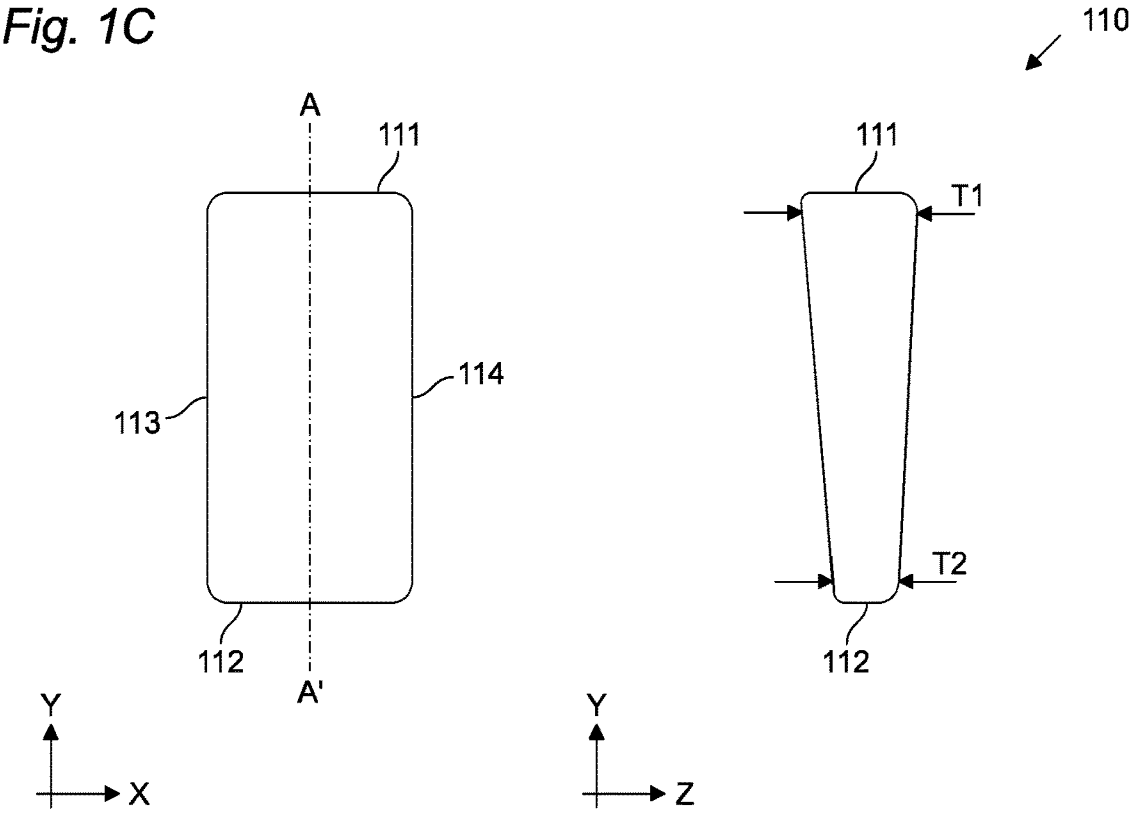

FIG. 1A schematically illustrates a top view, on the left, and a side view, on the right, of a pneumatic bladder arrangement 100 mounted on a seat S, in a substantially deflated configuration. FIG. 1B similarly schematically illustrates a top view, on the left, and a side view, on the right, of the pneumatic bladder arrangement 100, in a substantially inflated configuration. FIG. 1C schematically illustrates an enlarged top view, on the left, and an enlarged cross section view taken along line A-A', on the right, of an inflatable bladder 110 of the pneumatic bladder arrangement 100, in a substantially inflated configuration.

For explanation purposes, the seat S will be illustrated as the seat of a vehicle, preferably of a car. It will however be clear that the invention is not limited thereto and it can be applied to any seat. Application to a vehicle seat is particularly advantageous as the invention, compared to the prior art, achieves a low weight and a high degree of adaptation of the seat to the body of the occupant, both of which are criteria which are generally requested and appreciated in vehicle seats. Moreover, the invention drastically reduces the number of parts which might pose a risk in a collision. To the contrary, by introducing pneumatic bladders, it might even form a passive safety device in case of a collision. Both those features are highly appreciated in vehicle seats.

In the illustration of FIGS. 1A-1C, the pneumatic bladder arrangement is mounted in a shoulder region of a backrest of a seat S. As will be clearer from the subsequent description, the invention is not limited to this use of the pneumatic bladder arrangement. For instance, as visible in FIGS. 10A, 10B, 11A and 11B, the pneumatic bladder arrangement can be mounted in other parts of the seat S. Thus, throughout the following description, unless a feature or an advantage of the pneumatic bladder arrangement is strictly dependent on its placement in a specific part of the seat S, it will be understood that this feature or advantage can apply to various uses of the pneumatic bladder arrangement.

Reverting to FIGS. 1A-1C, a pneumatic bladder arrangement 100 for a seat S can comprise a plurality of inflatable bladders 110. The number of inflatable bladders 110 is not particularly limited. As will become clearer from the following, in some embodiments the plurality of inflatable bladders 110 preferably comprises an odd number of bladders, as this might allow an increase in the configuration of the pneumatic bladder arrangement without necessarily increasing the number of fluid supply connections. Generally, a higher number of bladders also results in an improved adaptability to different body shapes. The inventors have found that using three or five bladders for the plurality of inflatable bladders can represent an ideal trade-off functionality and costs. It will however be clear that the invention is not limited to those specific values.

In the following, a more specific description of one of the bladders will be provided. While reference is made to a single bladder, this is understood to possibly apply to more than one bladder of the plurality of bladders of the pneumatic bladder arrangement. Preferably, this might apply to a majority of the plurality of bladders of the pneumatic bladder arrangement, still more preferably to each of the plurality of bladders of the pneumatic bladder arrangement.

As visible in FIG. 1B and as more clearly indicated in the enlarged view of FIG. 1C, at least one of the plurality of inflatable bladders 110, when inflated, can have a first edge 111 with a first thickness T1 and a second edge 112 with a second thickness T2. The first thickness T1 is preferably bigger than the second thickness T2.

Throughout the description, the expression when inflated relates to an inflation of at least 30%, preferably at least 60%, even more preferably at least 90%.

In preferred embodiments, the first thickness T1 is preferably comprised between 1 cm and 15 cm, even more preferably between 2 cm and 8 cm. Alternatively, or in addition, the second thickness T2 is preferably comprised between 1 cm and 12 cm, preferably between 1 cm and 5 cm.

In some embodiments, the first thickness T1 can correspond to a thickness of the thickest portion of the bladder. Alternatively, or in addition, the second thickness T2 can correspond to a thickness of the thinnest portion of the bladder Alternatively, or in addition, the first and second thickness can be measured at the respective edge of the bladder. In some embodiments, the term edge can understood to be an outmost extremity of the bladder. Alternatively, or in addition, the edge can comprise a region within 15%, preferably 10%, even more preferably 5% of the length of the bladder starting from a respective outmost extremity of the bladder. In this latter case, in some embodiments, the first and/or second thickness can be measured at the thickest part of the bladder in the respective region.

In general, the bladder has a shape elongated along a given direction. In the example of FIG. 1C, the elongation direction corresponds to the Y direction. The length in the elongation direction is intended to be the length of the bladder. Moreover, the thickness is intended to be measured perpendicularly to the length. Alternatively, or in addition, the thickness is intended to be measure in a direction substantially parallel to a plane of a seat backrest or cushion, in which the pneumatic bladder arrangement is to be mounted. Still alternatively, or in addition, the thickness can be measured along a direction in which the bladder inflates.

The difference between the thickness T1 and T2 results in the inflatable bladder generally having a wedge-like shape, when inflated. Preferably, the inflatable bladder, when inflated, has a wedge-like cross section shape and/or a wedge-like shape when seen from the side. In some embodiments the cross section is intended as being taken along a cross section plane defined by the length and thickness of the bladder.

Similarly, the side is intended as a view from a direction perpendicular to such cross section plane.

The wedge-like shape, in some embodiments, can be a shape in which the inflatable bladder, when inflated, has a cross section in which the two longest sides are substantially linear and not parallel, converging toward each other from the first edge 111 toward the second edge 112. Alternatively, or in addition, in some embodiments the wedge-like shape can be a shape in which the inflatable bladder, when inflated, has a cross section, taken along a plane perpendicular to its longitudinal direction, which monotonically decreases for a at least one region comprised between the first edge 111 and the second edge 112, when moving from the first edge 111 toward the second edge 112. Preferably, this cross section can monotonically decrease from the first edge 111 to the second edge 112. Preferably, in some embodiments, in addition to be monotonically decreasing the cross section can also gradually decrease.

This is for instance clearly visible in the cross section view on the right side of FIG. 3C. This shape is particularly advantageous in various configurations, some examples of which will be described in the following.

In a preferred application, illustrated in FIGS. 1A-1C, the pneumatic bladder arrangement 100 can be mounted as shoulder support in a seat S. In particular, the pneumatic bladder arrangement 100 can be mounted on a top portion of a backrest of a seat S. In this configuration, when mounted, the first edge 111 is positioned higher than the second edge 112 with respect to a vertical direction of the seat S.

In other words, with reference to the vertical direction Y indicated in FIGS. 1A-1C, the pneumatic bladder arrangement 100 can be mounted so that the first edge 111 of at least one bladder 100, preferably of a majority of bladders and even more preferably of all bladders, is higher, in the vertical direction, than the second edge 112. Preferably the at least one bladder 100 is mounted so that its direction of longitudinal extension is substantially parallel to a direction of longitudinal extension of the backrest.

This has the advantage that, when inflated, the top portion of the pneumatic bladder arrangement 100 has a bigger thickness than the bottom portion of the pneumatic bladder arrangement 100. This is particularly advantageous as it conforms better to the shape of the shoulder of an occupant, as well as avoiding a step being created between the second edge and the part of the backrest below it.

Figure 10A:
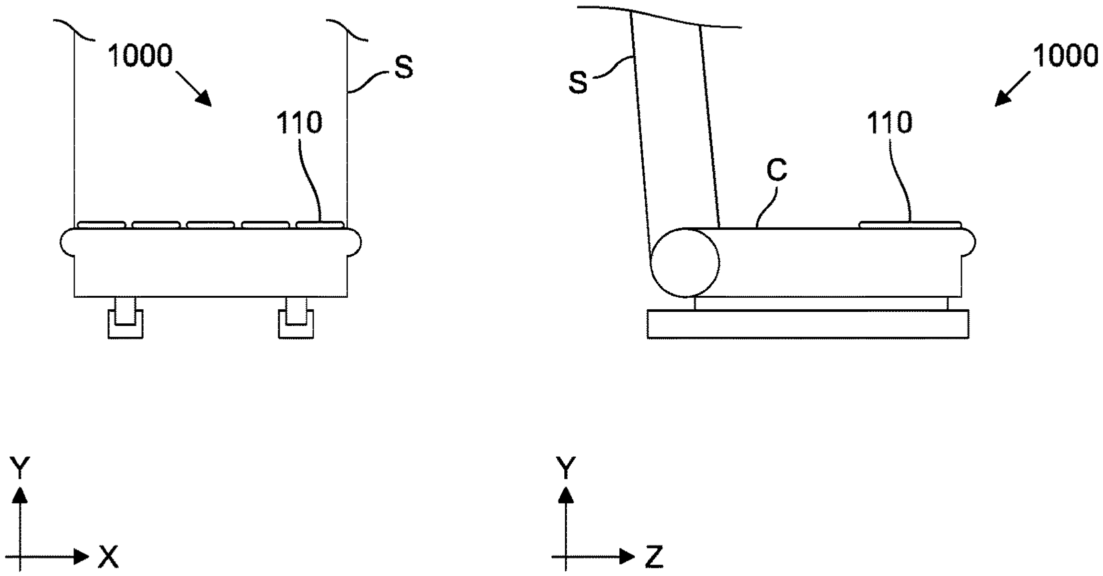
Figure 10B:
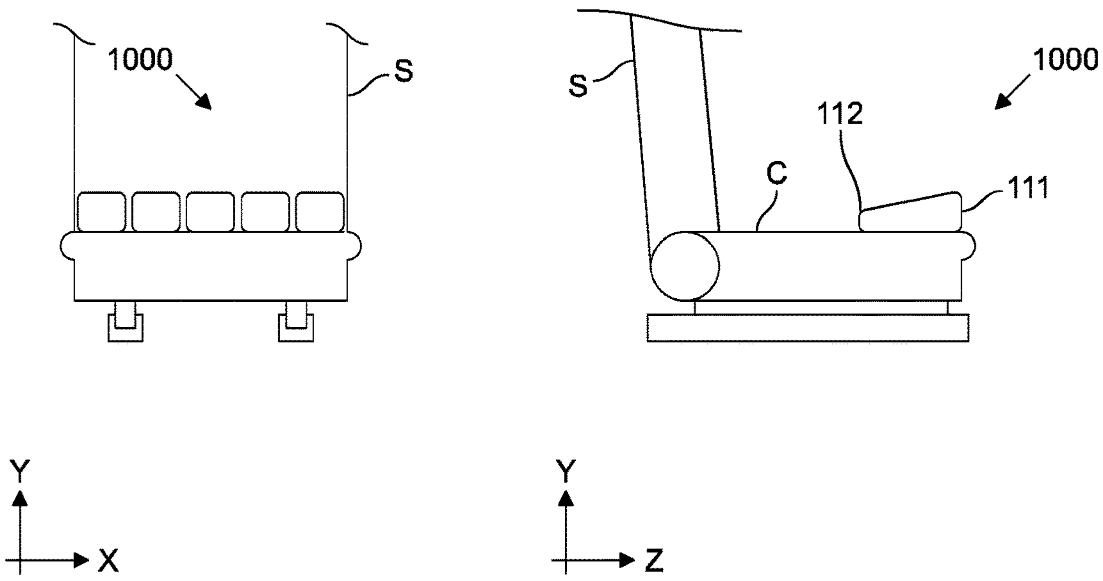

In an alternative preferred application, illustrated in FIGS. 10A, 10B, the pneumatic bladder arrangement 1000 can be mounted as a leg support in a seat S. In particular, the pneumatic bladder arrangement 1000 can be mounted on a front portion of a cushion C of the seat S. In this configuration, when mounted, the first edge 111 is closer to a front extremity of the cushion C of the seat S than the second edge 112. Here, the pneumatic bladder arrangement 1000 differs from the pneumatic bladder arrangement 100 due to its positioning in the seat, all other features of the pneumatic bladder arrangement 100 being otherwise applicable to the pneumatic bladder arrangement 1000.

In other words, the pneumatic bladder arrangement 1000 can be mounted so that the first edge 111 is further away from the backrest of the seat S than the second edge 112. Even more preferably, the first edge 111 can be positioned substantially in correspondence with the front edge of the cushion C, namely the edge of the cushion C opposite the backrest.

This has the advantage that, when inflated, the front portion of the pneumatic bladder arrangement 1000 has a bigger thickness than the rear portion of the pneumatic bladder arrangement 1000, front and rear referring to the orientation of the seat S. This is particularly advantageous as it conforms better to the shape of the thighs of an occupant, particularly of a tall occupant, as well as avoiding a step being created between the second edge and the part of the cushion behind it, toward the backrest.

Figure 11A:
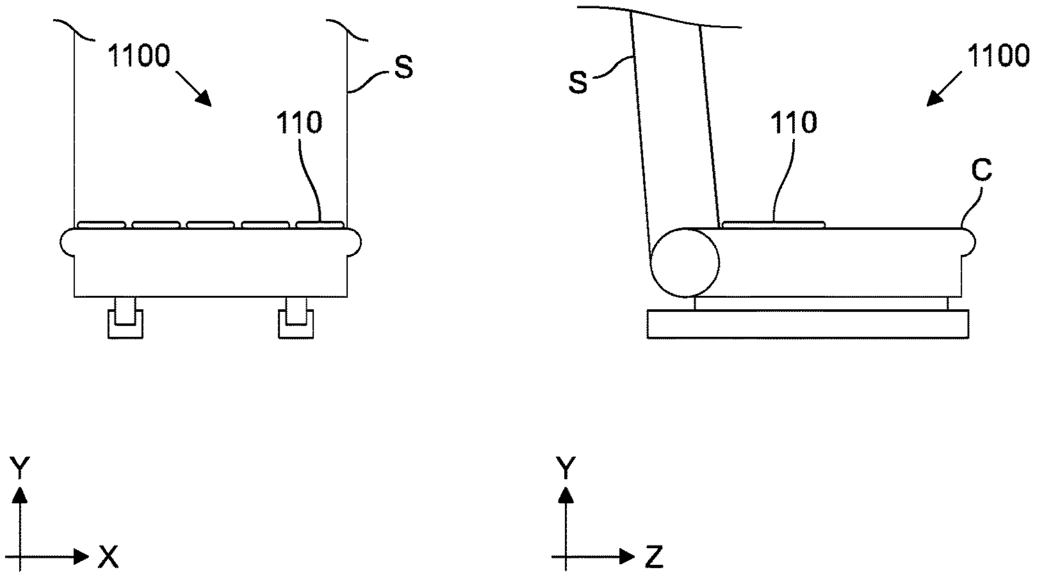
Figure 11B:
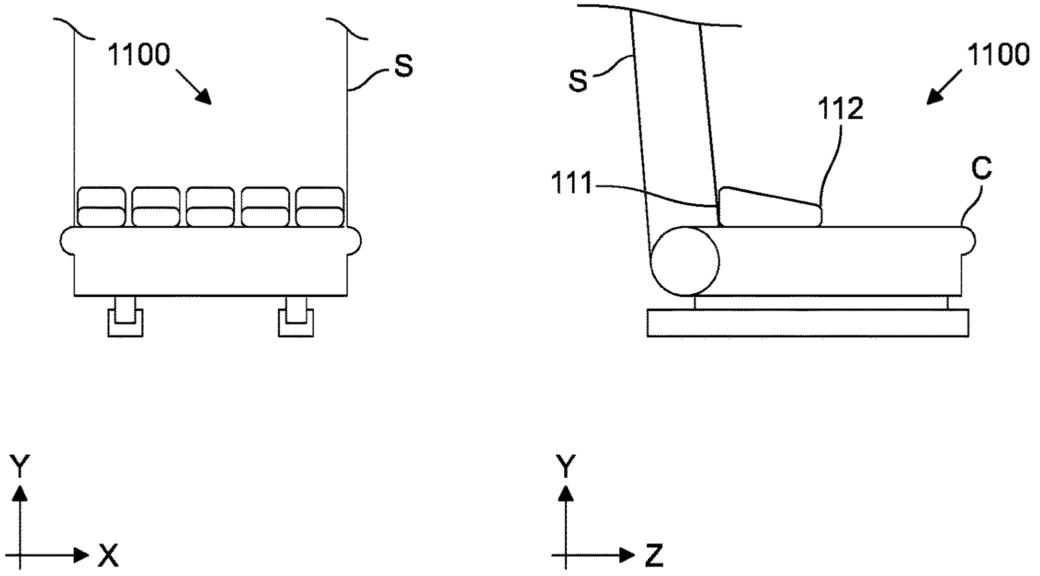

In yet an alternative preferred application, illustrated in FIGS. 11A, 11B, the pneumatic bladder arrangement 1100 can be mounted as a cushion support in a seat S. In particular, the pneumatic bladder arrangement 1100 can be mounted on a rear portion of a cushion C of the seat S. In this configuration, when mounted, the second edge 112 is closer to a front extremity of a cushion C of the seat S than the first edge 111. Here, the pneumatic bladder arrangement 1100 differs from the pneumatic bladder arrangement 100 due to its positioning in the seat, all other features of the pneumatic bladder arrangement 100 being otherwise applicable to the pneumatic bladder arrangement 1100.

In other words, the pneumatic bladder arrangement 1100 can be mounted so that the second edge 112 is further away from the backrest of the seat S than the first edge 111. Even more preferably, the second edge 112 can be positioned substantially in correspondence with the rear edge of the cushion C, namely the edge of the cushion C closest to the backrest.

This has the advantage that, when inflated, the rear portion of the pneumatic bladder arrangement 1100 has a bigger thickness than the front portion of the pneumatic bladder arrangement 1100, front and rear referring to the orientation of the seat S. This is particularly advantageous as it conforms better to the shape of the buttocks of an occupant, as well as avoiding a step being created between the second edge and the part of the cushion in front of it, away from the backrest.

This is further particular advantageous since, in most foldable seats S, when the backrest is extended toward a flatter configuration, most often a step, or a gap, is generated between the rear edge of the cushion and the bottom edge of the backrest. The possibility to inflate the pneumatic bladder arrangement 1100 in a wedge shape allows such step, or gap, to be compensated so that an occupant can lie on the extended seat without feeling such step, or gap, which would be generally perceived as being uncomfortable.

It will be clear that the above are exemplary applications of the pneumatic bladder arrangement and are not intended to limit the invention.

In the above description, reference has been made to a bladder as having a wedge-like shape, when seen from the side or in a cross section. In the following, various possible manners for obtaining such a shape in an inflatable bladder will be described.

Figure 2:
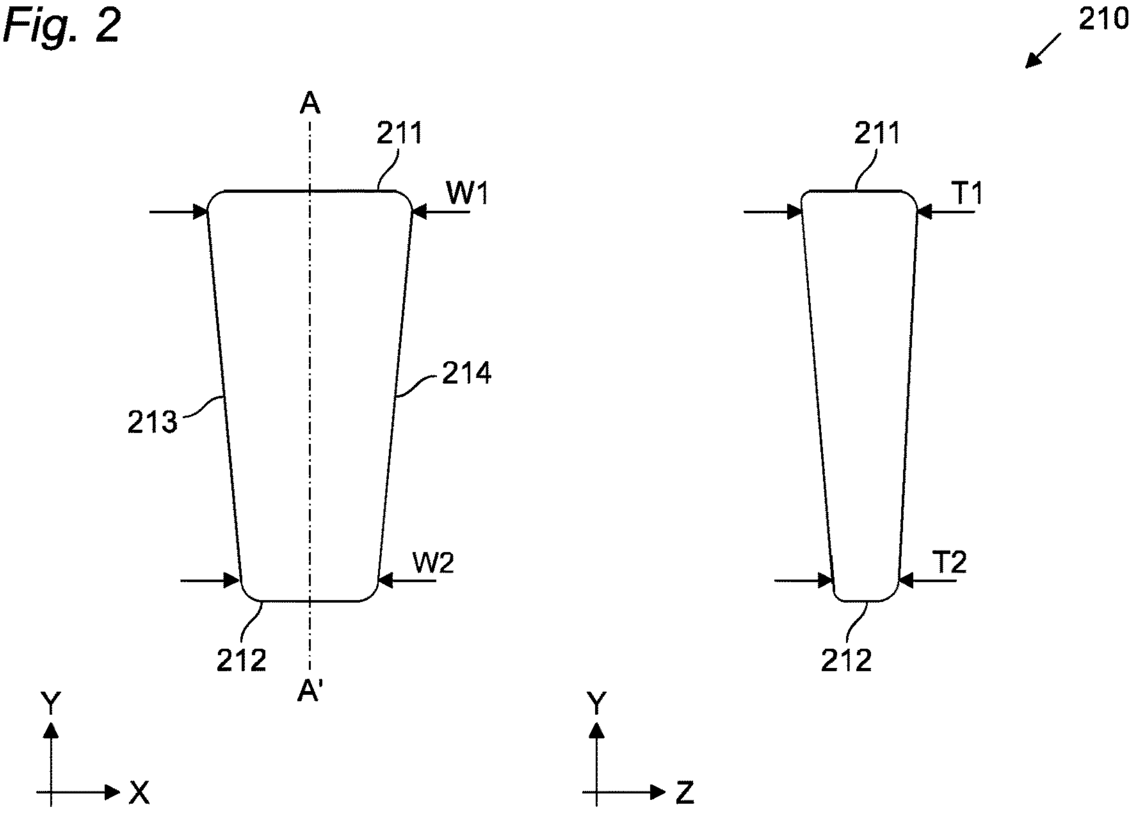

FIG. 2 schematically illustrates an enlarged top view, on the left, and an enlarged cross section view, on the right, of an inflatable bladder 210, in a substantially inflated configuration. The cross section is taken along line A-A'. The features described in the following in connection with the inflatable bladder 210 can be implemented on any of the inflatable bladders described throughout this document.

In particular, the bladder 210 has a third edge 213 and a fourth edge 214, wherein a first width W1 between the third edge 213 and the fourth edge 214 in proximity of the first edge 211 is larger than a second width W2 between the third edge 213 and the fourth edge 214 in proximity of the second edge 212.

In some embodiments, the third edge 213 and the fourth edge 214 can be edges connecting the first edge 111, 211 and the second edge 112, 212. This results in the bladder 210 having a substantially quadrilateral shape, preferably, a trapezoidal-like shape.

This shape is particularly recognizable in the top view, on the left of FIG. 2. In some embodiments, top view can be intended as a view taken from a direction perpendicular to the length of the bladder, substantially corresponding to direction Y in the figures, and to the inflation direction of the bladder, substantially corresponding to direction Z in the figures. Preferably, in some embodiments, the width between the third edge 213 and the fourth edge 214 monotonically decreases from the first width W1 toward the second width W2. Even more preferably, in some embodiments, the width between the third edge 213 and the fourth edge 214 monotonically decreases from the first edge 111, 211 toward the second edge 112, 212. Preferably, in some embodiments, in addition to be monotonically decreasing the width can also gradually decrease.

Thanks to such trapezoidal-like shape in the top view, the bladder automatically inflates to a wedge-like shape. In fact, as the width between the third edge 213 and the fourth edge 214 decreases, so does the cross section of the bladder taken on a plane perpendicular to its length. This reduction in cross section results in a lower thickness of the bladder and thus allows the wedge-like shape to be formed.

In the case of such trapezoidal-like shape in the top view, in some embodiments, the elongation or longitudinal direction of the bladder can be understood to mean a direction bisecting an angle defined by edges 213 and 214.

Figure 3:
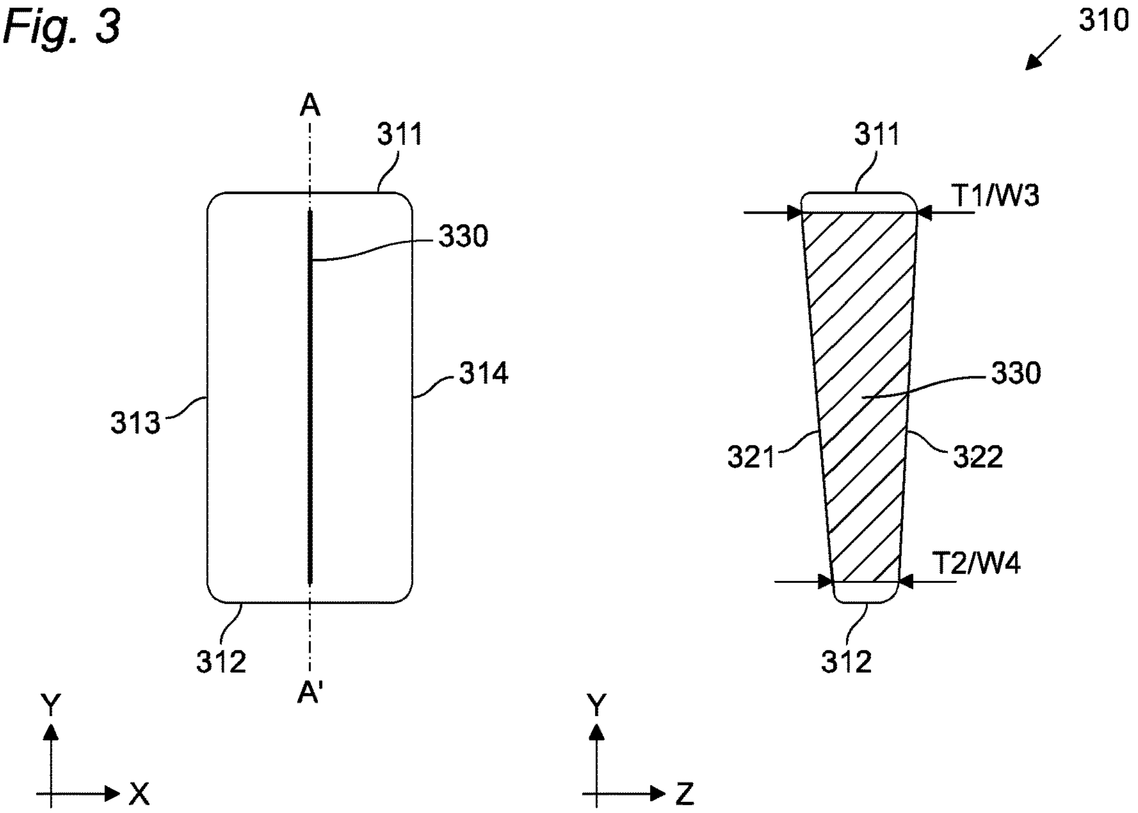

FIG. 3 schematically illustrates an enlarged top view, on the left, and an enlarged cross section view, on the right, of an inflatable bladder 310, in a substantially inflated configuration. The cross section is taken along line A-A'. The features described in the following in connection with the inflatable bladder 310 can be implemented on any of the inflatable bladders described throughout this document.

In particular, the bladder 310 comprises a thickness defining element 330 configured to limit an inflation thickness of the bladder 310. In some embodiments, the thickness defining element 330 can be implemented as a sheet of material being placed along a plane substantially aligned with the longitudinal direction of the bladder and with the inflating direction of the bladder. Preferably, as visible on the left side of FIG. 3, the thickness defining element 330 can be positioned substantially in the middle of the bladder.

The thickness defining element 330 generally limits the inflation thickness which can be achieved at one or more regions of the bladder. Thus, by configuring the thickness defining element 330, the thickness of such one or more regions can be defined, so as to obtain the wedge-like shape.

In some embodiments, the bladder 210, 310 can in particular further comprises a first sheet of flexible material 321 and a second sheet of flexible material 322, which are bound together to form the bladder. In this case, the thickness defining element 330 can be bound to the first sheet of flexible material 321 and to the second sheet of flexible material 322. In this manner, the thickness defining element 330 limits a maximum relative distance between the first sheet of flexible material 321 and the second sheet of flexible material 322, this regulating the inflating thickness of the bladder.

In some embodiments, the thickness defining element 330 can be bound to the first sheet of flexible material 321 and to the second sheet of flexible material 322 in a direction substantially perpendicular to the first edge 111 and/or to the second edge 112. Alternatively, or in addition, the thickness defining element 330 can be bound to the first sheet of flexible material 321 and to the second sheet of flexible material 322 in a substantially longitudinal direction of the bladder.

In some embodiments, as visible in the left part of FIG. 3, the thickness defining element 330 can have a third width W3 substantially corresponding to the first thickness T1 and/or a fourth width W4 substantially corresponding to the second thickness T2. Preferably, the thickness defining element 330 has a decreasing width between the third width W3 and the fourth width W4. Even more preferably, the width of the thickness defining element 330 is monotonically decreasing between the third width W3 and the fourth width W4. Preferably, in some embodiments, in addition to be monotonically decreasing the width can also gradually decrease. In some embodiments the width of the thickness defining element 330 can be measure in the inflation direction of the bladder, that is, in the direction of measurement of the first thickness T1 and of the second thickness T2. Thus, in some embodiments, as visible in the left part of FIG. 3, the thickness defining element 330 can have a substantially trapezoidal or a substantially triangular shape.

Preferably, the thickness defining element 330 is made of the same material as the first sheet of flexible material 321 and/or the second sheet of flexible material 322. This allows a simplified manufacturing.

Figure 4:
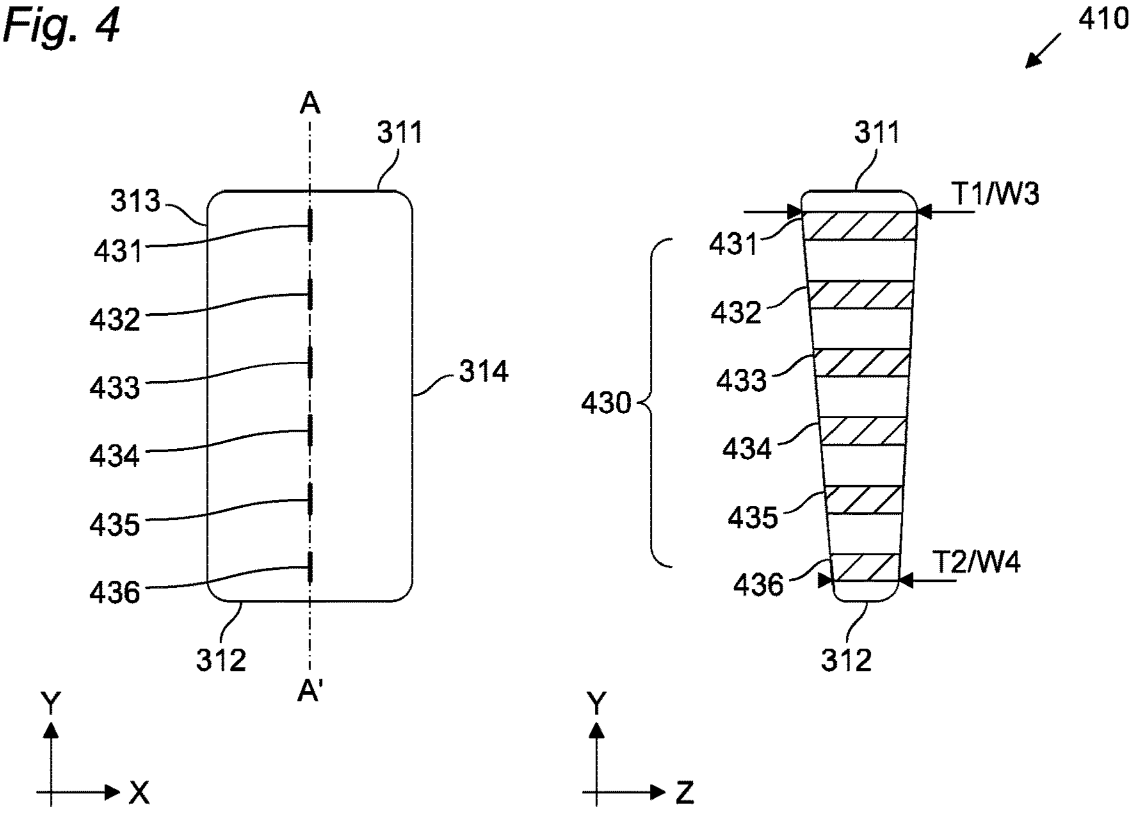

While the thickness defining element 330 has been illustrated in FIG. 3 as being a single piece of material, the invention is not limited thereto. In particular, FIG. 4 schematically illustrates an enlarged top view, on the left, and an enlarged cross section view, on the right, of an inflatable bladder 410, in a substantially inflated configuration. The cross section is taken along line A-A'. The features described in the following in connection with the inflatable bladder 310 can be implemented on any of the inflatable bladders described throughout this document.

As can be seem in FIG. 4, the thickness defining element 430 can also be implemented by a plurality of separate portions, preferably substantially placed on a single plane previously defined for the thickness defining element 330. the number of portions is not limited to the illustrated embodiment. The implementation of the thickness defining element 430 with a plurality of portions allows avoiding the a better pneumatic connection between the various volumes within the bladder, and in particular between the volume to the left and to the right of the thickness defining element 430, with reference to the left view of FIG. 4.

A yet alternative manner for obtaining the wedge-like shape will be discussed with reference to FIG. 12.

Figure 12:
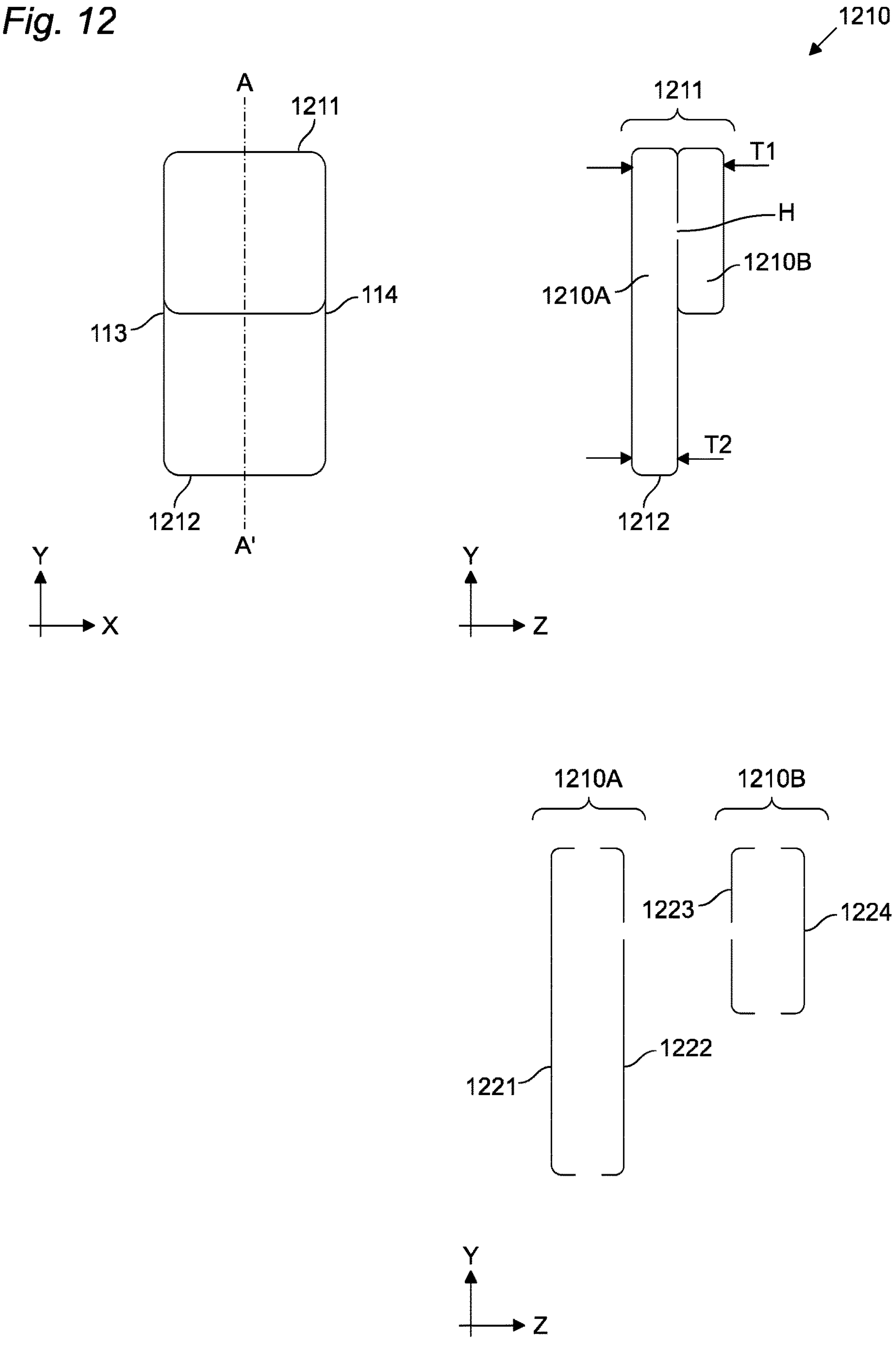

In particular, FIG. 12 schematically illustrates an enlarged top view, on the top left, and an enlarged cross section view, on the top right, of an inflatable bladder 1210, in a substantially inflated configuration. The cross section is taken along line A-A'. On the bottom right, an exploded cross section view of the inflatable bladder 1210 is visible. The features described in the following in connection with the inflatable bladder 1210 can be implemented on any of the inflatable bladders described throughout this document.

As visible in FIG. 12, the bladder 1210 is a composite bladder and comprises a first sub-bladder 1210A and a second sub-bladder 1210B, which are overlapped and in pneumatic communication with each other, for instance through a hole H.

In some embodiments the first sub-bladder 1210A and the second sub-bladder 1210B can each to be understood as being a bladder. The second sub-bladder 1210B preferably in smaller, particularly when seen in a top view, than the first sub-bladder 1210A.

The first sub-bladder 1210A and the second sub-bladder 1210B can each be implemented as previously described with two sheets of flexible material. In particular, as visible on the bottom right part of FIG. 12, a sheet of flexible material 1221 and a sheet of flexible material 1222 can realize the first sub-bladder 1210A and a sheet of flexible material 1223 and a sheet of flexible material 1224 can realize the second sub-bladder 1210B. In this configuration, the hole H can be preferably implemented in the sheets 1222 and 1223 although it will be clear to those skilled in the art that alternative manners are possible for connecting the two sub-bladders.

Preferably, the second sub-bladder 1210B is positioned on the first sub-bladder 1210A closer to the first edge 111, 1211 than to the second edge 112, 1212. in this manner, the additional thickness implemented by the second sub-bladder 1210B allows to implement the difference between the first thickness T1 and the second thickness T2, thus obtaining the wedge-like shape.

Although the composite bladder has been described as comprising two sub-bladders only, the present invention is not limited thereto and it will be clear that a higher number of overlapping sub-bladders can be implemented, for instance with the aim of obtaining a more gradual decrease in thickness from T1 to T2.

Thus, as visible from the above description, various manners can be implemented for obtaining the difference in thicknesses T1 and T2 and more generally the wedge-like shape of the bladder. Those manners can be combined as needed. Moreover, not all bladders in the pneumatic bladder arrangement need to be implemented in the same manner for achieving the wedge-like shape.

In the schematic illustration of FIGS. 1, 10 and 11, the bladders of the pneumatic bladder arrangement are illustrated as being arranged next to each other. This is more clearly visible in the enlarged view illustrated in FIG. 8. Although a plurality of bladders 310 are illustrated as being implemented in FIG. 8, any combination of bladders can be implemented.

Preferably, the combined dimension of the bladders in the X direction is substantially comprised between 30 cm and 60 cm, even more preferably between 35 cm and 50 cm. The X direction can correspond to a width direction of the seat S.

Figure 8:
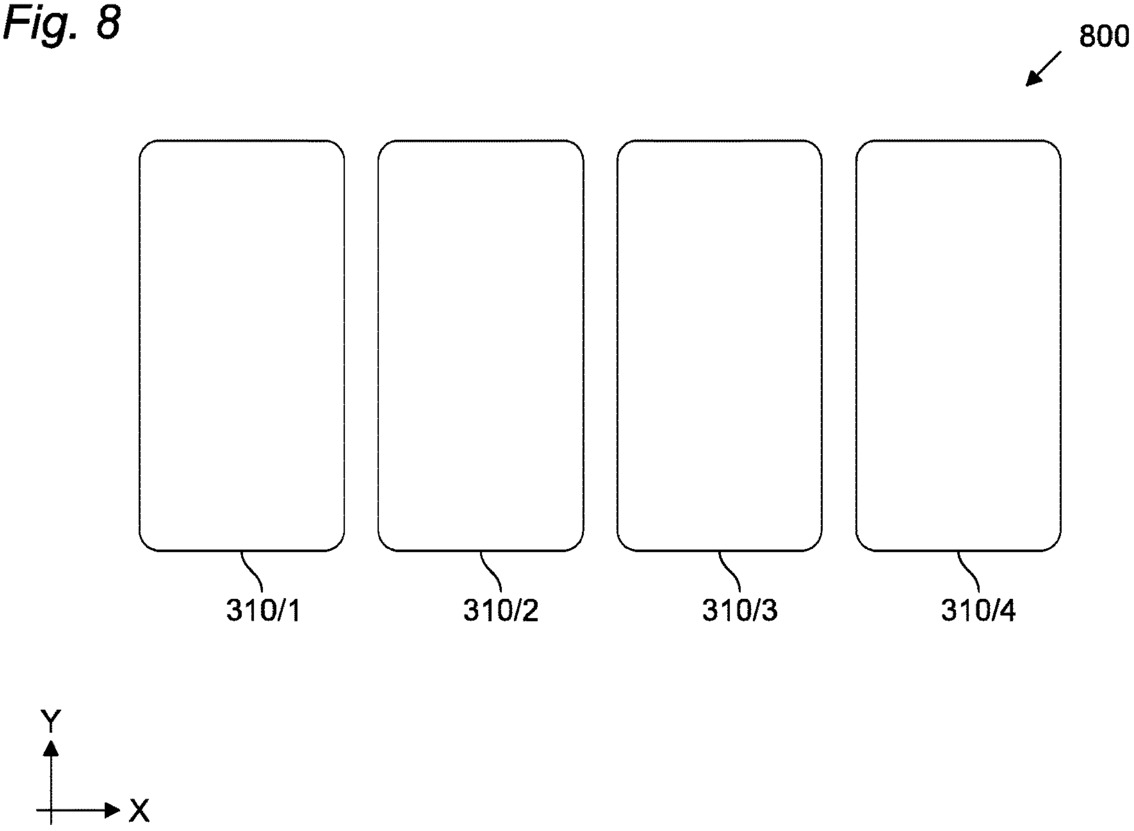

In some embodiments, one or more of the plurality of bladders, preferably a majority thereof and even more preferably each of them, can have a substantially elongated shape along an elongation direction. In FIG. 8 this direction substantially corresponds to direction Y. The plurality of bladders can be positioned in the pneumatic bladder arrangement so that the elongation direction of two or more bladders, preferably of each of them is substantially parallel. In some embodiments, substantially parallel can be understood as meaning within an angle of 20 degrees, preferably within an angle of 10 degrees.

Moreover, in some embodiments, two or more bladders, preferably each of them, can have their first edge 111 oriented toward the same direction of the pneumatic bladder arrangement.

Figure 7:
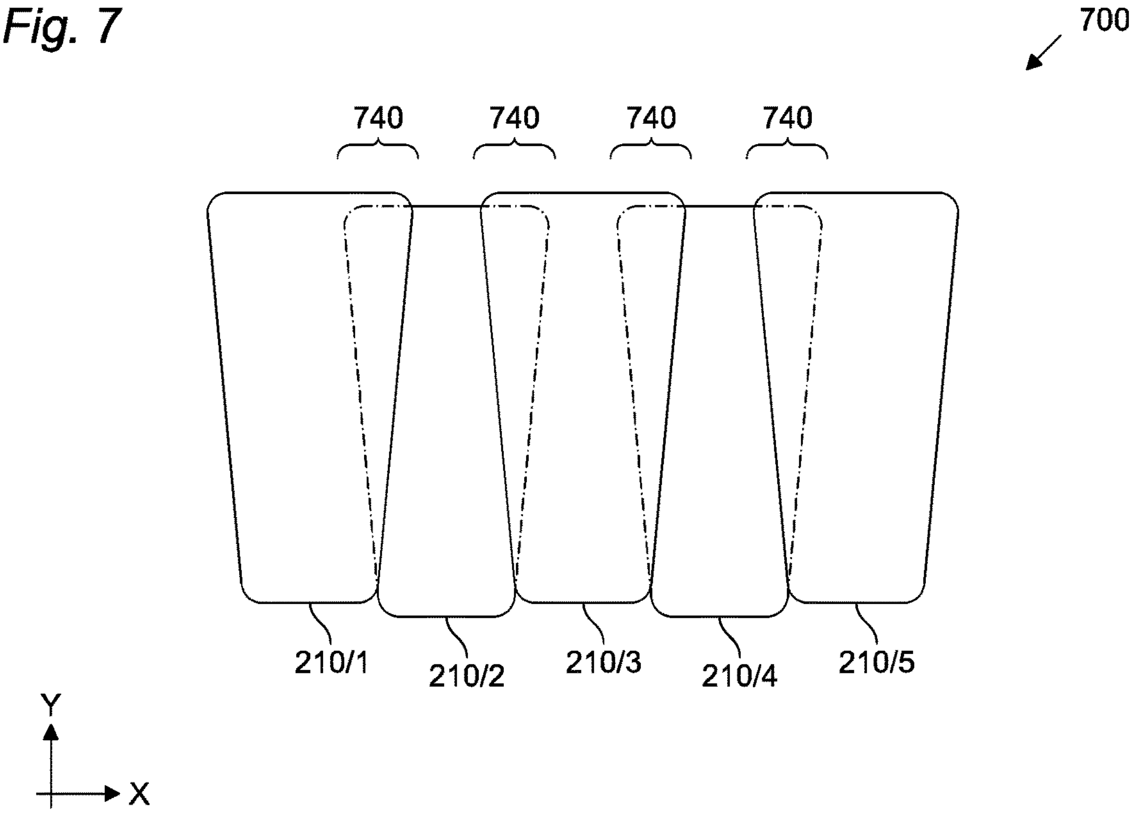

Further preferably, in some embodiments the first edge 111 of two or more bladders, preferably of each of them, can be placed substantially along a line. In the illustrated example this corresponds to direction X. In some embodiments, as illustrated in FIG. 7, the placement substantially along a line can be understood to mean that the first edges 111 can be within a predetermined distance from a straight line, wherein the predetermined distance is preferably less than 20% of the length of the bladders, even more preferably less than 10%. The same considerations made here with respect to first edge 111 can be made, alternatively, or in addition, with respect to second edge 112.

While in FIG. 8 the bladders are illustrated as non-overlapping, the present invention is not limited thereto. In particular, as visible in FIG. 7, at least two of the plurality of inflatable bladders can at least partially overlap each other. As in FIG. 8, although a plurality of bladders 210 are illustrated as being implemented in FIG. 7, any combination of bladders can be implemented.

The overlapping can be particularly advantageous in increasing the wedge-like shape of the pneumatic bladder arrangement. Thus, in some embodiments, the one or more overlapping regions 740 can be at least in a region of the pneumatic bladder arrangement closer to the first edge 111 than to the second edge 112. Alternatively, or in addition, the one or more overlapping regions 740 can have a large area in a region of the pneumatic bladder arrangement closer to the first edge 111 than to the second edge 112.

The overlapping can be present when the bladders are not inflated. In addition, in some embodiments, the overlapping can also be present when the bladders are inflated.

In some embodiments the plurality of bladders can thus obtain a pneumatic bladder arrangement having a length, direction Y in the drawings, substantially corresponding to a length of a single bladder. Alternatively, or in addition, the in some embodiments the plurality of bladders can thus obtain a pneumatic bladder arrangement having a width, direction X in the drawings, substantially corresponding to the sum of the widths of the bladders.

In the above description, the bladders of the pneumatic bladder arrangement have been described without a specific indication of how they can be inflated and/or deflated as various manners for achieving this are known to the skilled person.

For instance, each bladder might be provided with a fluid supply connection, such as a pipe, to a pump and/or to a valve. This allows each bladder to be controlled independently, so as to allow the user to independently define the thickness of various regions of the pneumatic bladder arrangement.

Figure 9A:
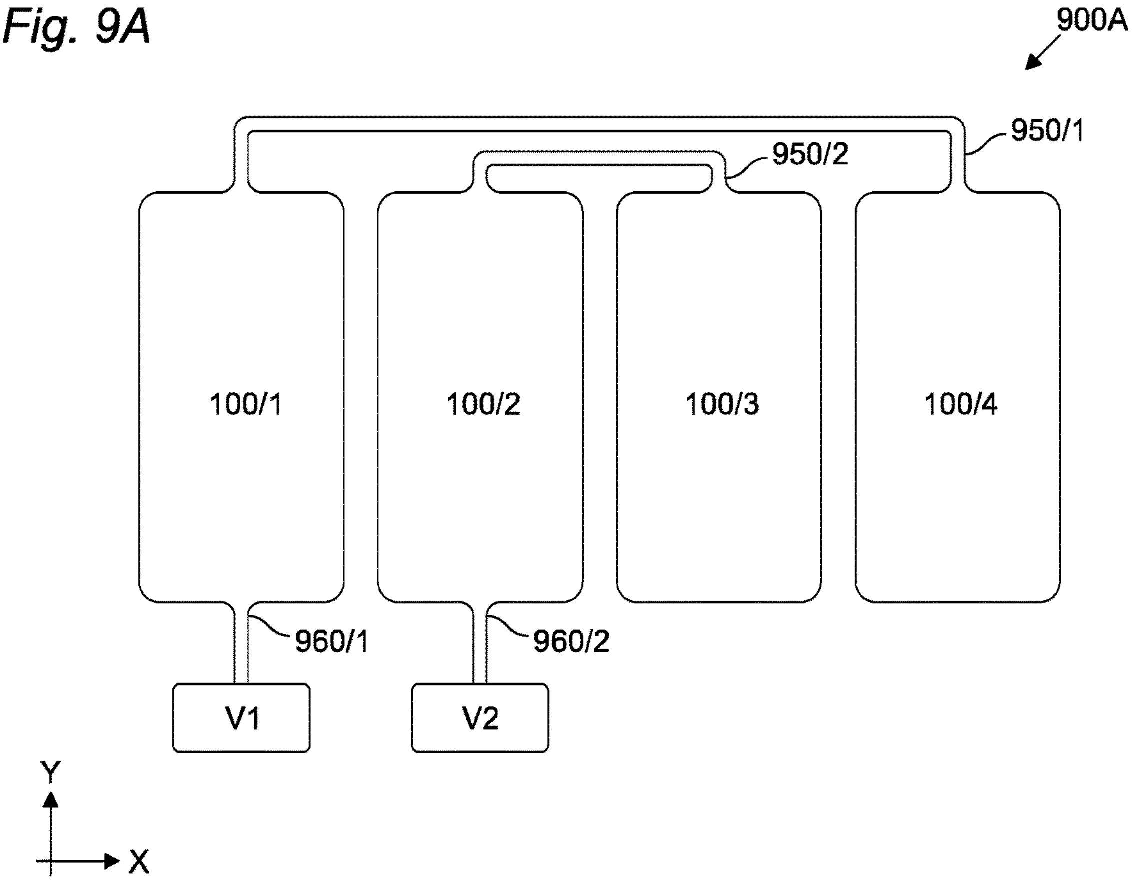

Alternatively, or in addition, as visible for instance in FIG. 9A, some bladders might be connected to each other. In particular, one or more couples of the plurality of inflatable bladders can each comprise a first inflatable bladder and a second inflatable bladder. In the exemplary illustration of FIG. 9A, a first such couple comprises bladder 100/1 as first bladder and bladder 100/4 as second bladder, or vice-versa. The illustrated embodiment also comprises a second such couple with bladder 100/2 as first bladder and bladder 100/3 as second bladder, or vice-versa. In this configuration, the first inflatable bladder can be in fluid connection with the second inflatable bladder through a fluid interconnection 950/1, 950/2.

Thanks to this connection, as visible in FIG. 9A, the first and second bladders of each couple can be inflated and deflated by means of a single fluid supply connection 960/1, 960/2 and a single valve V1, V2, instead of using one fluid supply connection and one valve for each bladder. This is particularly advantageous as it reduces the number of fluid supply connections and valves.

The lack of possibility of controlling each bladder independently is usually not a drawback, particularly if, as illustrated the bladders are connected by the fluid interconnection in a symmetrical manner with respect to an axis of symmetry of the pneumatic bladder arrangement. In some embodiments, such axis of symmetry is preferably aligned with the X direction, in the drawing, or with a longitudinal direction of one or more of the bladders. Preferably, the axis of symmetry is placed substantially in the middle of the width of the pneumatic bladder arrangement.

Thanks to this arrangement, it is thus possible to control the bladders of the pneumatic bladder arrangement which are connected through the fluid interconnections in a symmetrical manner. Usually, this is not perceived by the users as a drawback but, rather, as an appreciated feature, since symmetrical parts of the pneumatic bladder arrangement usually act on symmetrical regions of the body, for which the user expect a symmetrical inflation thickness.

The number of couples of bladders connected by a fluid interconnection 950/1, 950/2 is not limited to the two couples illustrated. In those embodiments implementing such couples, at least one couple can be present, preferably two, or at least two.

Moreover, in the embodiments implementing one or more such couples, not all bladders need to be connected in such a couple. This is illustrated, for instance, in FIG. 9B. As can be seen, bladder 100/3 is independently connected to its own fluid supply connection 960/3 and valve V3, and is not connected in a couple.

Figure 9B:
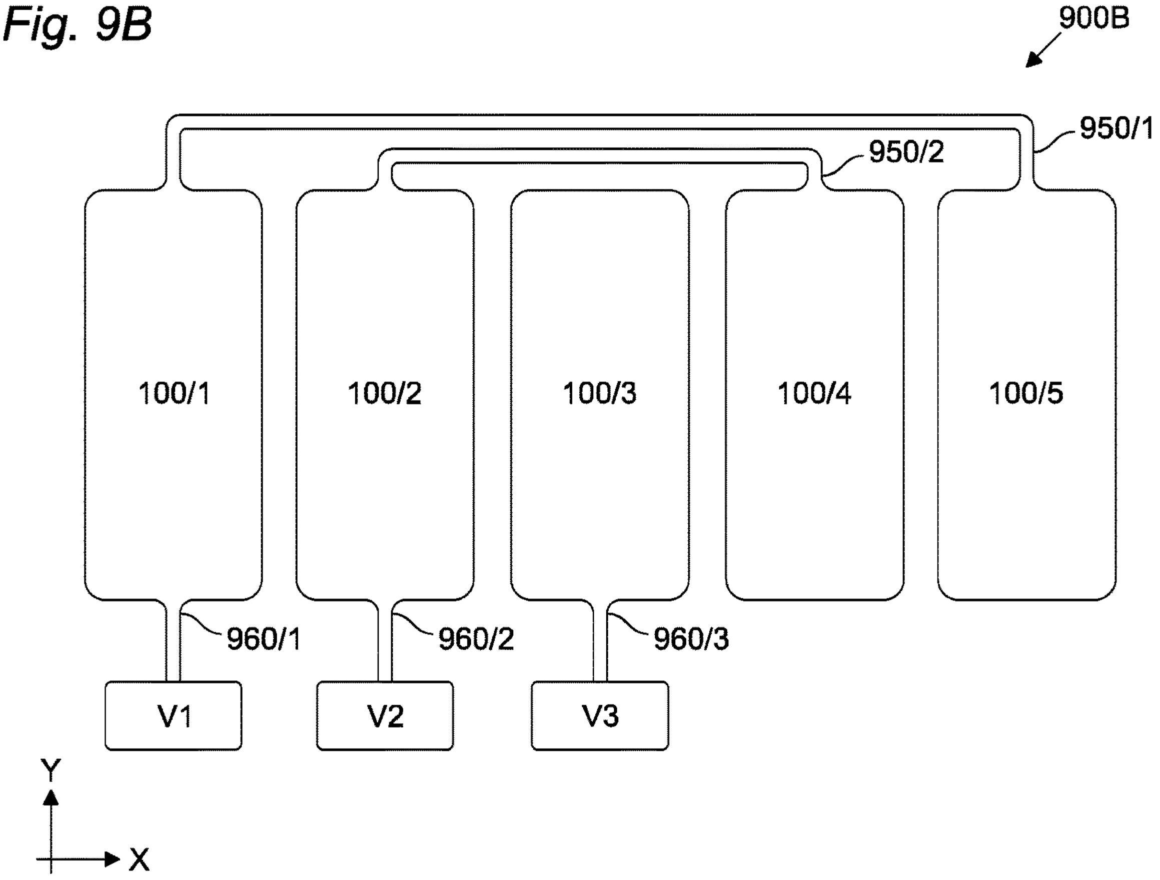

Preferably, in some embodiments, if some bladders are connected in couples and some are not, at least one of the bladders not connected in a couple is placed substantially in the middle of the bladder arrangement, in the width direction, as illustrated in FIG. 9B for bladder 100/3. This configuration has the advantage that such central bladder can be controlled independently. For instance, when the pneumatic bladder arrangement is implemented as a shoulder support, the central bladder might be preferably controlled independently as it is the one acting on the spine of the user.

Thus, it has been described how the pneumatic bladder arrangements can be implemented as support in various positions of a seat. It will therefore be clear that some embodiments of the invention can also relate to a seat S comprising the pneumatic bladder arrangement. One such example is illustrated in FIGS. 13A and 13B where the pneumatic bladder arrangement is mounted as a shoulder support.

Figure 13A:
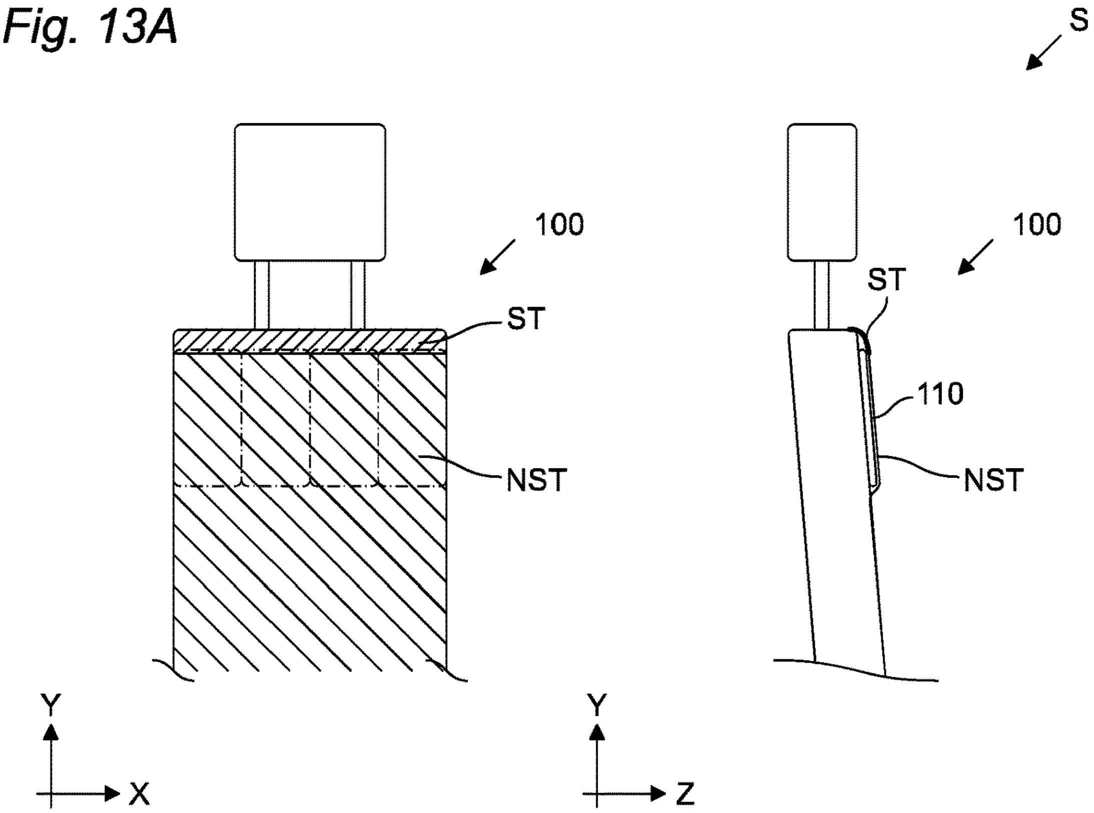
Figure 13B:
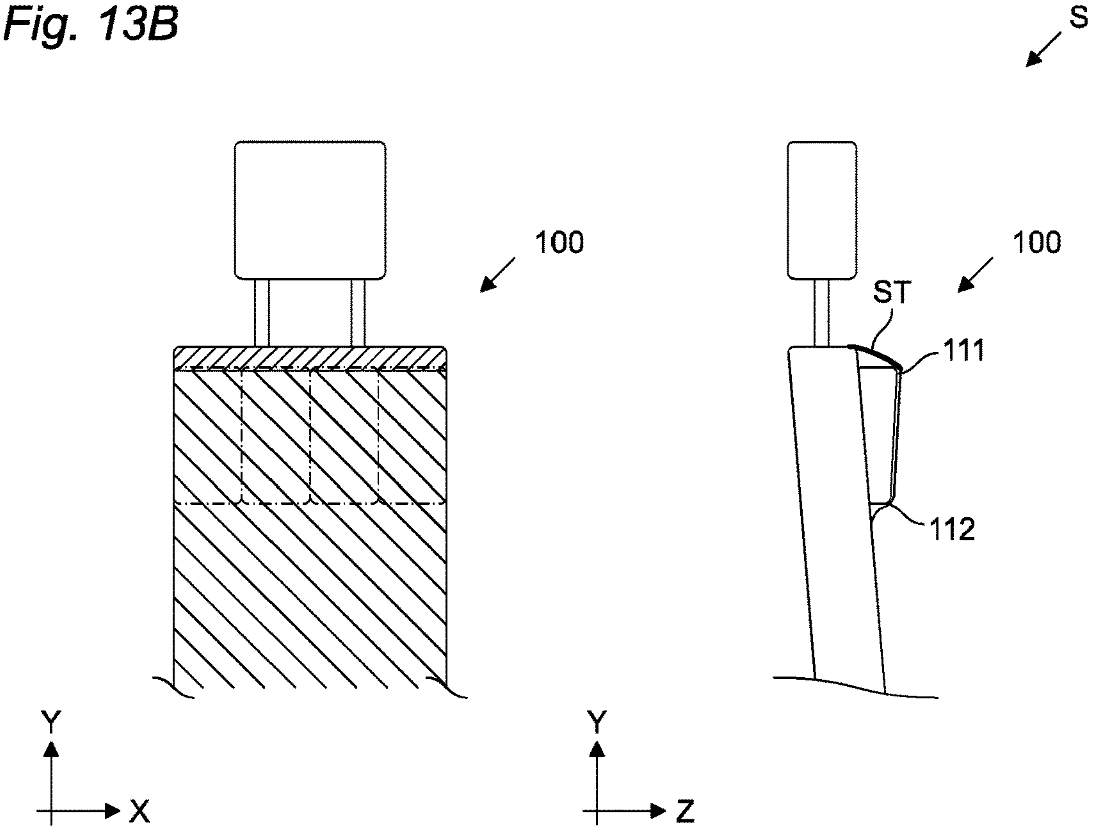

In particular, FIG. 13A schematically illustrates a top view, on the left, and a side view, on the right, of a seat S, with a pneumatic bladder arrangement 100 in a substantially deflated configuration, while FIG. 13B respectively illustrates the substantially inflated configuration.

In some embodiments, the seat S can comprising a trim, with the pneumatic bladder arrangement being placed under the trim, possibly with some additional elements in between, such as padding layers. In some embodiments, the trim can comprise a stretchable material, such as various kinds of fabric. In those embodiments the inflation of the pneumatic bladder arrangement can result be accommodated by the stretching of the trim. Some preferred seat trims, however, are not particularly stretchable, one example being leather. In some embodiments in which the trim comprises such non-stretchable trim, NST in FIGS. 13A and 13B, the trim can also preferably comprise a stretchable trim ST in FIGS. 13A and 13B. The stretchable trim ST can be provided so as to allow inflating of the pneumatic bladder arrangement.

It will be clear that various shapes and/or positioning of the stretchable trim ST can achieve such result. Without limiting the invention, in some embodiments such as the one illustrated in FIGS. 13A and 13B, the stretchable trim ST can be preferably provided at least in a part of the seat closer to the first edge 111 than to the second edge 112. This configuration allows the stretchable trim ST to be in a position in which it can be most effective with respect to the specific inflation shape of the pneumatic bladder arrangement of the invention.

In several practical applications, the seat S might also comprise padding material, such as, for instance, foam. The positioning of the pneumatic bladder arrangement with respect to this padding material is not limited.

The pneumatic bladder arrangement can thus be mounted under the padding material, that is, between the seat frame and the padding material. Alternatively, or in addition, it can be mounted in between various layers of, or in a hole of, the padding material. Still alternatively, or in addition, it can be mounted over the padding material, that is, between padding material and the trim.

Each of those options, as will be clear to the skilled person, has various advantages. The mounting under the padding material, in particular, provides the advantage that the pneumatic bladder arrangement can be implemented also in seats where no space would be available between the padding material and the trim, for instance because another pneumatic bladder arrangement is positioned at that location. This can be the case, for instance, for pneumatic bladder arrangements intended for massage purposes, which are generally preferably placed closer to the trim.

In the description above, various shapes for the inflatable bladders have been described. Experts in the field of inflatable bladder manufacturing are aware of various technologies for implementing those shapes, for instance by bonding together sheets of flexible material.

Figure 5A:
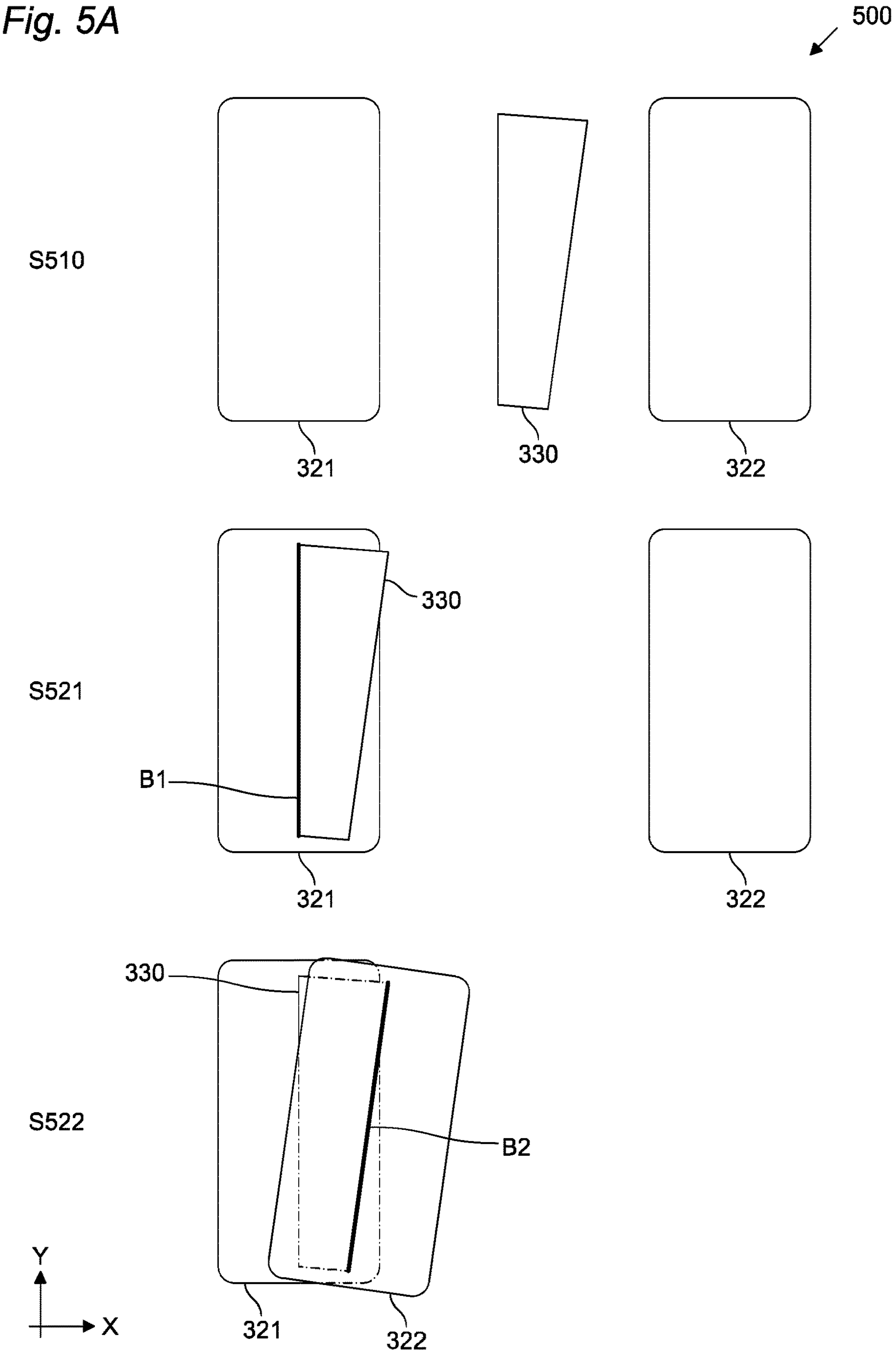
Figure 5B:
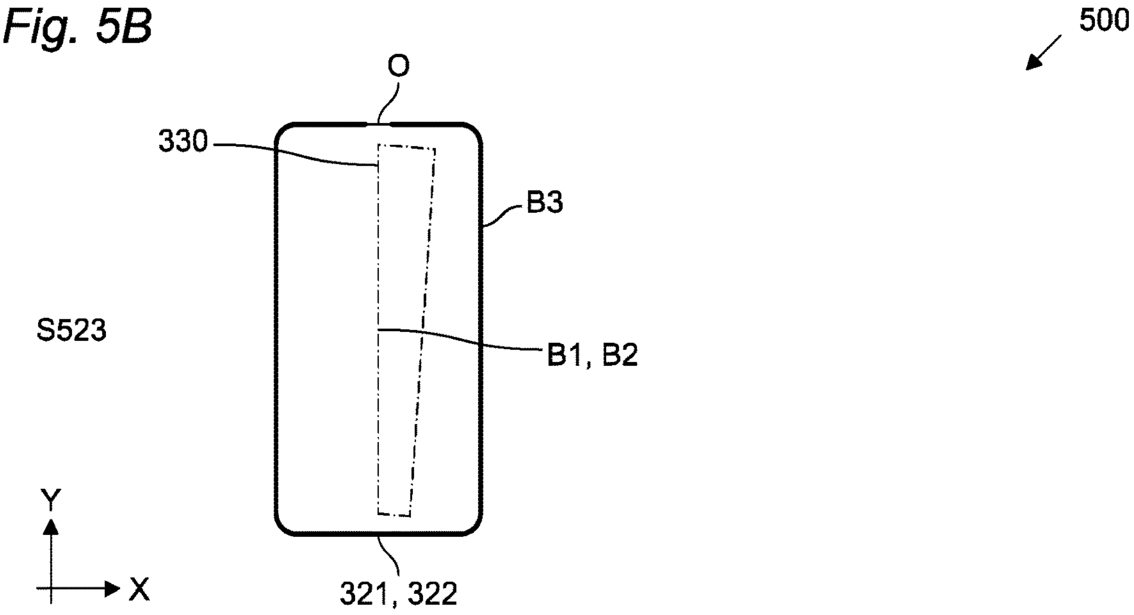

FIGS. 5A and 5B schematically illustrate a method 500 for manufacturing an inflatable bladder according to an embodiment of the invention. In particular, the manufacturing method 500 could be used for obtaining some of the features described in connection with the inflatable bladder 310.

The method 500 comprises a step S510 of providing a first sheet of flexible material 321, a second sheet of flexible material 322 and a thickness defining element 330. In some embodiments, the thickness defining element 330 might also be implemented by a sheet of flexible material with characteristics similar, or identical, to those of the first sheet of flexible material 321 and/or of the second sheet of flexible material 322. While the various elements have been illustrated in FIG. 5A as being cut to a predetermined shape prior to step S510, for clarity of illustration, it is clear that the invention is not limited thereto and a cutting step of the sheets of flexible material might be implemented at a later stage.

The method 500 further comprises a step S521 of bonding the first sheet of flexible material 321 to the thickness defining element 330. In the figure, such bonding is indicted by B1. Preferably, the thickness defining element 330 has an elongated shape with two longer edges, and one such longer edge can be bonded to the first sheet of flexible material 321. In some embodiments the bonding B1 is substantially in the longitudinal direction of the inflatable bladder and preferably in a middle portion thereof, in the width direction.

The method 500 further comprises a step S522 of bonding the second sheet of flexible material 322 to the thickness defining element 330. In the figure, such bonding is indicted by B2. Preferably, the thickness defining element 330 has an elongated shape with two longer edges, and the longer edge other than the one which has been bonded to the first sheet of flexible material 321 can be bonded to the second sheet of flexible material 322. In some embodiments the bonding B2 is substantially in the longitudinal direction of the inflatable bladder and preferably in a middle portion thereof, in the width direction.

The method 500 can then further comprise a step S523 of bonding the first sheet of flexible material 321 to the second sheet of flexible material 322. In the figure, such bonding is indicted by B3. An opening O might be left open for acting as a fluid connection.

The above described method 500 is particularly advantageous in that it allows the inflatable bladder 310 to be obtained with a reduced number of steps. As can be seen in FIG. 5A, the bonding lines B1 and B2 are not parallel, nor overlapping, owing to the shape of the thickness defining element 330. This results in the need to move the first and/or second sheets of flexible material between steps S522 and S523, so as to allow the alignment needed for bonding B3 to be carried out.

Figure 6A:
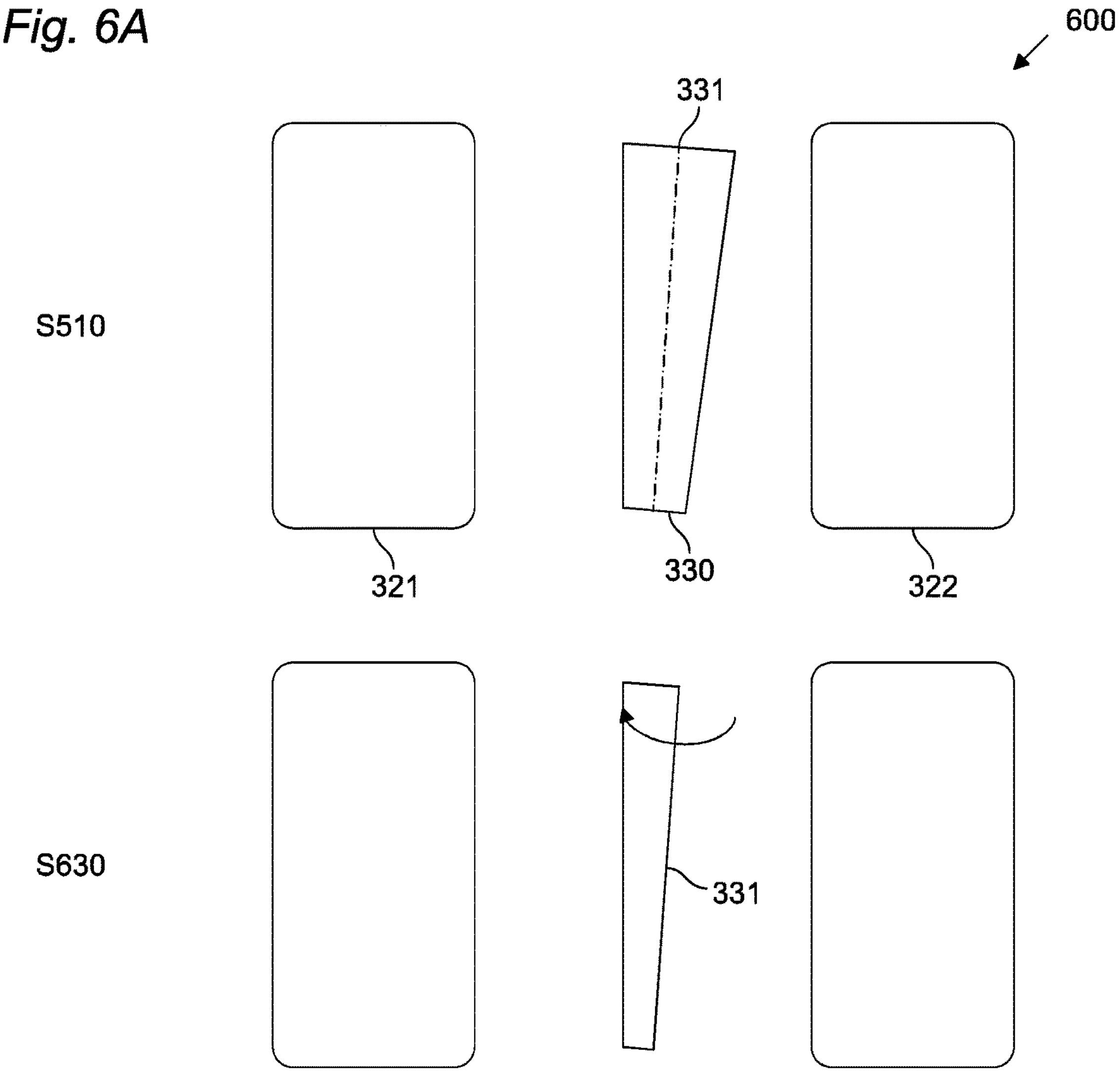
Figure 6B:
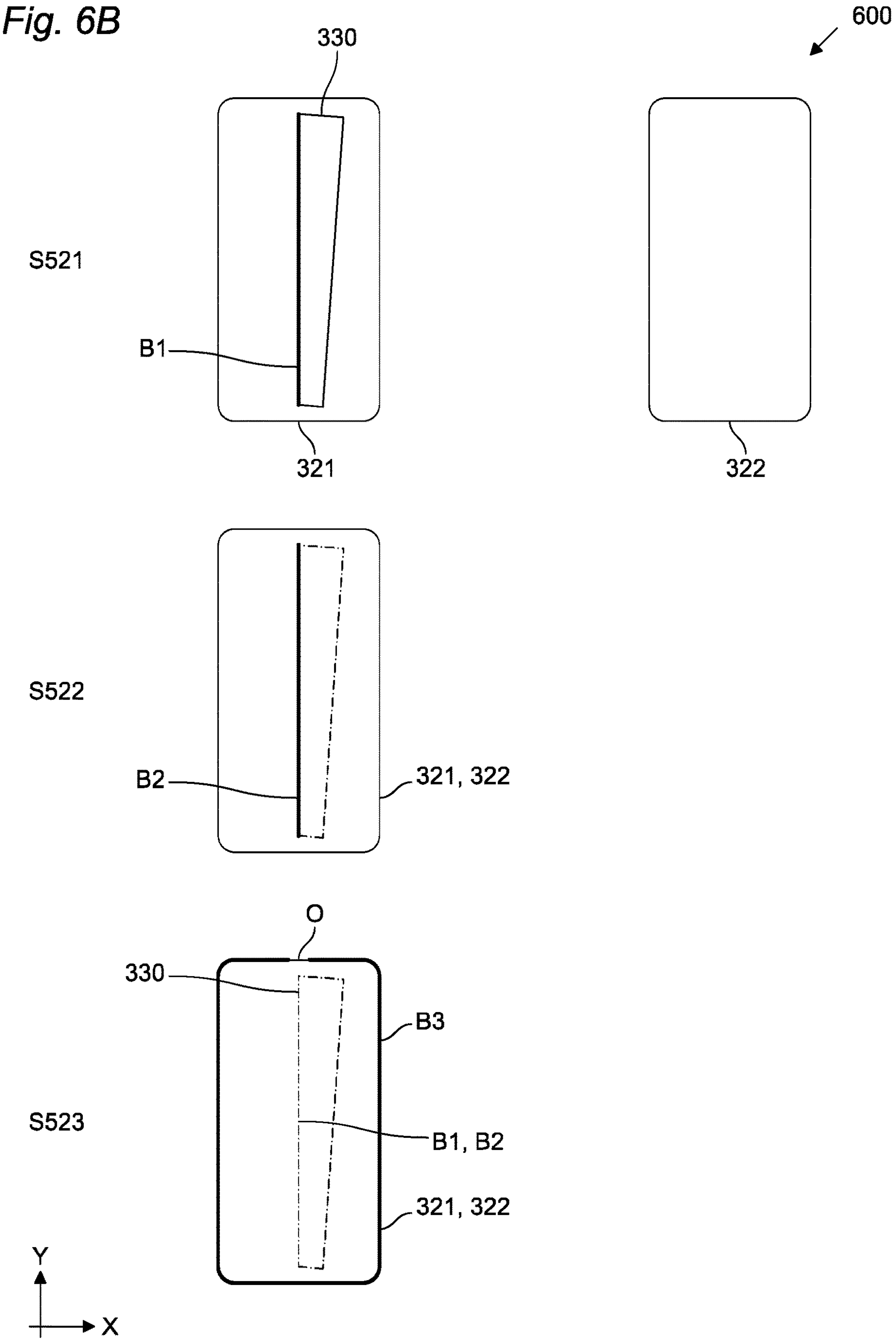

Alternatively, or in addition, as illustrated in FIGS. 6A and 6B, such movement of the first and/or second sheets of flexible material can be avoided.

In particular, FIGS. 6A and 6B schematically illustrate a method 600 for manufacturing an inflatable bladder. Method 600, compared to method 500, can further comprise a step S630 of bending the thickness defining element 330. Step S630 can be implemented at any time during the manufacturing. In the illustrated example this is implemented prior to step S521, so as to allow the bending to be carried out when the thickness defining element 330 has not yet been bonded, the invention is however not limited thereto.

Preferably, the thickness defining element 330 has a shape with two longer edges and the bending step S630 is performed such that those two longer edges substantially overlap after the bending.

Thanks to the bending step, as visible in FIG. 6B, the bonding steps S521, S522 and S523 can be implemented in succession without any rearrangement of the position of the various sheets of flexible material. This is particularly advantageous as it allows a parallel manufacturing of a plurality of inflatable bladders from respectively a single first sheet of flexible material and/or a single second sheet of flexible material.

It has thus been described how a pneumatic bladder arrangement can be manufactured and/or structured so as to be mounted on a seat. The difference in thickness at the extremities of the bladders of the pneumatic bladder arrangement, and in particular their wedge-like shape, allow advantageous uses of the pneumatic bladder arrangement, some examples of which have been indicated, in particular as shoulder or cushion support.

While various features have been described as being combined to implement given embodiments, one or more features from one or more embodiment can be combined in any manner resulting in additional embodiments, as will be clear to those skilled in the art.

LIST OF REFERENCE NUMERALS

100: pneumatic bladder arrangement
110: inflatable bladder
111, 112, 113, 114: edge
S: seat
T1, T2: thickness
210: inflatable bladder
211, 212, 213, 214: edge
W1, W2: width
310: inflatable bladder
311, 312, 313, 3140: edge
321, 322: sheet of flexible material
330: thickness defining element
331: median line
W3, W4: width
410: inflatable bladder
430: thickness defining element
431-436: portion
500: manufacturing method
S510: providing step
S521-S523: bonding step
B1, B2, B3: bonding line
O: opening
600: manufacturing method
S630: bending step
700: pneumatic bladder arrangement
740: overlapping regions
800: pneumatic bladder arrangement
900A: pneumatic bladder arrangement
900B: pneumatic bladder arrangement
950/1, 950/2: fluid interconnection
960/1, 960/2, 960/3: fluid supply connection
V1, V2, V3: valve
1000: pneumatic bladder arrangement
C: cushion
1100: pneumatic bladder arrangement
1210: inflatable composite bladder
1210A, 1210B: sub-bladder
1221, 1222, 1223, 1224: sheet of flexible material
H: communication hole
NST: non-stretchable trim
ST: stretchable trim

The invention claimed is:

1. A pneumatic bladder arrangement for a seat comprising:

a plurality of inflatable bladders, wherein at least one of the plurality of inflatable bladders, when inflated, has a first edge with a first thickness and a second edge with a second thickness, and wherein the first thickness is bigger than the second thickness, and wherein the at least one of the plurality of inflatable bladders includes a thickness defining element configured to limit an inflation thickness of the at least one of the plurality of inflatable bladders, and wherein the at least one of the plurality of inflatable bladders includes a first sheet of flexible material and a second sheet of flexible material, which are bound together to form the at least one of the plurality of inflatable bladders, and wherein the thickness defining element is bound to the first sheet of flexible material and to the second sheet of flexible material, and wherein the thickness defining element is bound to the first sheet of flexible material and to the second sheet of flexible material in a direction perpendicular to the first edge or to the second edge, and wherein when the pneumatic bladder arrangement is mounted as shoulder support in a seat, the first edge is higher than the second edge with respect to a vertical direction of the seat.

2. The pneumatic bladder arrangement of claim 1, wherein the at least one of the plurality of inflatable bladders, when inflated, has a wedge-like shape.

3. The pneumatic bladder arrangement of claim 1, wherein the at least one of the plurality of inflatable bladders, when inflated, has a wedge-like cross section shape.

4. The pneumatic bladder arrangement of claim 1, wherein the at least one of the plurality of inflatable bladders has a third edge and a fourth edge, wherein a first width between the third edge and the fourth edge in proximity of the first edge is larger than a second width between the third edge and the fourth edge in proximity of the second edge.

5. The pneumatic bladder arrangement of claim 1, wherein the at least one of the plurality of inflatable bladders has a trapezoidal shape.

6. The pneumatic bladder arrangement of claim 1, wherein the thickness defining element is bound to the first sheet of flexible material and to the second sheet of flexible material in a longitudinal direction of the at least one of the plurality of inflatable bladders.

7. The pneumatic bladder arrangement of claim 1, wherein the thickness defining element has a third width corresponding to the first thickness and a fourth width corresponding to the second thickness.

8. The pneumatic bladder arrangement of claim 7, wherein the thickness defining element has a decreasing width between the third width and the fourth width.

9. The pneumatic bladder arrangement of claim 1, wherein the thickness defining element (330, 430) has a trapezoidal or a triangular shape.

10. The pneumatic bladder arrangement of claim 1, wherein the thickness defining element is of the same material as the first sheet of flexible material or the second sheet of flexible material.

11. The pneumatic bladder arrangement of claim 1, wherein the at least one of the plurality of inflatable bladders is a composite bladder and includes a first sub-bladder and a second sub-bladder, which are overlapped and in pneumatic communication with each other.

12. The pneumatic bladder arrangement of claim 1, wherein at least two of the plurality of inflatable bladders at least partially overlap each other.

13. The pneumatic bladder arrangement of claim 1, wherein the plurality of inflatable bladders are arranged next to each other.

14. The pneumatic bladder arrangement of claim 1, wherein one or more couples of the plurality of inflatable bladders each include a first inflatable bladder and a second inflatable bladder, and wherein the first inflatable bladder is in fluid connection with the second inflatable bladder through a fluid interconnection.

15. The pneumatic bladder arrangement of claim 1, wherein when the pneumatic bladder arrangement is mounted as a leg support in a seat, the first edge is closer to a front extremity of a cushion of the seat than the second edge.

16. The pneumatic bladder arrangement of claim 1, wherein when the pneumatic bladder arrangement is mounted as a cushion support in a seat, the second edge is closer to a front extremity of a cushion of the seat than the first edge.

17. The pneumatic bladder arrangement of claim 1, wherein the first thickness is between 1 cm and 15 cm, and wherein the second thickness is between 1 cm and 12 cm.

18. The pneumatic bladder arrangement of claim 1, wherein the plurality of inflatable bladders includes an odd number of bladders.

19. The pneumatic bladder arrangement of claim 1, further comprising a seat having the pneumatic bladder arrangement.

20. The pneumatic bladder arrangement of claim 19, wherein the seat includes a non-stretchable trim and a stretchable trim, wherein the stretchable trim is provided so as to allow inflating of the pneumatic bladder arrangement.

21. The pneumatic bladder arrangement of claim 20, wherein the stretchable trim is provided at least in a part of the seat closer to the first edge than to the second edge.

22. A method for manufacturing the inflatable bladder for the pneumatic bladder arrangement for the seat as claimed in claim 1, the method comprising: providing the first sheet of flexible material, the second sheet of flexible material and the thickness defining element, bonding the first sheet of flexible material to the thickness defining element, bonding the second sheet of flexible material to the thickness defining element, and bonding the first sheet of flexible material to the second sheet of flexible material.

23. The method of claim 22, further comprising bending the thickness defining element.

* * * * *